(12) United States Patent
Nakasho et al.

(10) Patent No.: US 10,857,944 B2
(45) Date of Patent: Dec. 8, 2020

(54) PERIPHERY MONITORING APPARATUS

(71) Applicant: AISIN SEIKI KABUSHIKI KAISHA, Kariya (JP)

(72) Inventors: Takayuki Nakasho, Anjo (JP); Kazuya Watanabe, Anjo (JP); Tetsuya Maruoka, Okazaki (JP); Kinji Yamamoto, Anjo (JP); Takashi Hiramaki, Nagoya (JP); Takuya Hashikawa, Nagoya (JP); Naotaka Kubota, Kariya (JP); Osamu Kimura, Nagoya (JP); Itsuko Ohashi, Nagoya (JP); Yasumasa Yamamoto, Chita-gun (JP)

(73) Assignee: AISIN SEIKI KABUSHIKI KAISHA, Karoya (JP)

( * ) Notice: Subject to any disclaimer, the term of this patent is extended or adjusted under 35 U.S.C. 154(b) by 0 days.

(21) Appl. No.: 16/337,550

(22) PCT Filed: May 16, 2017

(86) PCT No.: PCT/JP2017/018423
§ 371 (c)(1),
(2) Date: Mar. 28, 2019

(87) PCT Pub. No.: WO2018/061294
PCT Pub. Date: Apr. 5, 2018

(65) Prior Publication Data
US 2020/0031283 A1   Jan. 30, 2020

(30) Foreign Application Priority Data

Sep. 30, 2016   (JP) ................. 2016-194399

(51) Int. Cl.
B60R 1/00        (2006.01)
B60W 40/02       (2006.01)
B60W 50/14       (2020.01)

(52) U.S. Cl.
CPC ............ B60R 1/002 (2013.01); B60W 40/02 (2013.01); B60W 50/14 (2013.01); *B60W 2050/146* (2013.01); *B60W 2420/403* (2013.01)

(58) Field of Classification Search
CPC ........... B60R 1/002; B60R 1/00; B60R 11/02; B60W 40/02; B60W 50/14;
(Continued)

(56) References Cited

U.S. PATENT DOCUMENTS 7,366,595 B1    4/2008  Shimizu et al.
2006/0287825 A1 12/2006 Shimizu et al.
(Continued)

FOREIGN PATENT DOCUMENTS

CN    105282499 A    1/2016
JP    11-222808 A    8/1999
(Continued)

OTHER PUBLICATIONS

International Search Report for PCT/JP2017/018423 dated Aug. 8, 2017 [PCT/ISA/210].

*Primary Examiner* — Jared Walker
(74) *Attorney, Agent, or Firm* — Sughrue Mion, PLLC

(57) ABSTRACT

A periphery monitoring apparatus includes: a detector configured to detect a roughness state of a road surface in a traveling direction of a vehicle; an acquisition unit configured to acquire a guide marker to be superimposed onto an image based on captured image data output from an imager that captures an image of a peripheral region including the traveling direction of the vehicle, the guide marker being
(Continued)

displayed in a manner that follows a roughness state of the road surface in the traveling direction of the vehicle; and a controller configured to superimpose the guide marker onto the image in the display manner that follows the roughness state and display the image on a display device.

16 Claims, 20 Drawing Sheets

(58) Field of Classification Search
CPC ...... B60W 2050/146; B60W 2420/403; H04N 7/18; G08G 1/00; G08G 1/16
USPC ........................................................ 348/148
See application file for complete search history.

(56) References Cited

U.S. PATENT DOCUMENTS

| | | | |
|---|---|---|---|
| 2006/0287826 A1* | 12/2006 | Shimizu ................. | B60K 35/00 701/431 |
| 2015/0203035 A1* | 7/2015 | Watanabe ............. | B60W 50/14 382/103 |
| 2016/0009225 A1 | 1/2016 | Watanabe et al. | |
| 2018/0058879 A1 | 3/2018 | Tayama et al. | |

FOREIGN PATENT DOCUMENTS

| | | |
|---|---|---|
| JP | 2003-335196 A | 11/2003 |
| JP | 2005-150938 A | 6/2005 |
| JP | 2008-42235 A | 2/2008 |
| WO | 2016/152553 A1 | 9/2016 |

* cited by examiner

PERIPHERY MONITORING APPARATUS

CROSS-REFERENCE TO RELATED APPLICATIONS

This application is national stage application of International Application No. PCT/JP2017/018423, filed May 16, 2017, which designates the United States, incorporated herein by reference, and which claims the benefit of priority from Japanese Patent Application No. 2016-194399, filed Sep. 30, 2016, the entire contents of which are incorporated herein by reference.

TECHNICAL FIELD

Embodiments of the present invention relate to a periphery monitoring apparatus.

BACKGROUND ART

Conventionally, techniques have been proposed that display a vehicle peripheral image captured by an onboard camera on a display device disposed in the interior of the vehicle and also display additional information such as a virtual vehicle ahead or behind to make it easier to determine the direction of the content of the peripheral image. Techniques that analyze a road surface state and display the analyzed information have also been proposed.

CITATION LIST

Patent Literature

Patent Document 1: Japanese Patent Application Laid-open No. 2005-150938
Patent Document 2: Japanese Patent Application Laid-open No. H11-222808

SUMMARY OF INVENTION

Problem to be Solved by the Invention

However, when a road surface state (for example, roughness state) is complicated, only with the provided information, it may be difficult to grasp the road surface state or grasp the relation between the road surface and the vehicle when the vehicle itself moves on the road surface. Furthermore, it may take time to understand the content of the provided information.

An object of the present invention is therefore to provide a periphery monitoring apparatus that enables users to grasp a road surface state or grasp a vehicle state more easily (intuitively) when driving.

Means for Solving Problem

A periphery monitoring apparatus according to embodiments of the present invention may comprise: a detector configured to detect a roughness state of a road surface in a traveling direction of a vehicle; an acquisition unit configured to acquire a guide marker to be superimposed onto an image based on captured image data output from an imager that captures an image of a peripheral region including the traveling direction of the vehicle, the guide marker being displayed in a manner that follows a roughness state of the road surface in the traveling direction of the vehicle; and a controller configured to superimpose the guide marker onto the image in the display manner that follows the roughness state and display the image on a display device. With this configuration, a guide marker in a display manner that follows a roughness state of the road surface is superimposed onto an image representing a peripheral region, so that the guide marker makes it easier to grasp the road surface state (for example, roughness state) in the image. Since the road surface state is easily grasped, the state of the vehicle in traveling on the road surface is easily grasped.

The acquisition unit of the periphery monitoring apparatus may acquire, as the guide marker, a path marker indicating an expected traveling direction of a wheel based on a steering angle of the vehicle. With this configuration, the road surface shape in the predicted traveling direction of the vehicle and the state of the vehicle passing through the road surface are more easily grasped with the roughness state of the path marker.

The controller of the periphery monitoring apparatus may perform a roughness highlighting process on a region in the image on which the guide marker is superimposed. With this configuration, it is simply necessary to perform a roughness highlighting process on a region having the guide marker superimposed in the image based on the captured image data acquired by the imager, thereby reducing the processing load.

The controller of the periphery monitoring apparatus may perform a highlighting process on a region indicating the roughness state of the road surface equal to or greater than a predetermined threshold. With this configuration, it is easy to distinguish a region equal to or greater than a predetermined threshold, for example, a region that requires caution when the vehicle passes or a region through which passage should be avoided, thereby making it easier to determine whether to drive the vehicle.

The acquisition unit of the periphery monitoring apparatus may acquire, as the guide marker, a virtual vehicle having a vehicle attitude changing with a roughness state of the road surface, the virtual vehicle being superimposed onto a region in the traveling direction of the vehicle. With this configuration, the attitude of the vehicle taken when the vehicle travels can be presented in advance with the attitude of the virtual vehicle, so that the road surface situation and the situation where the vehicle travels (shaking state and inclination state) can be grasped more intuitively.

The acquisition unit of the periphery monitoring apparatus may acquire, as the virtual vehicle, a partial virtual vehicle including a wheel on a side far from a wheel of the vehicle on a front side in the traveling direction, the partial virtual vehicle being acquired when a position of a wheel of the virtual vehicle on a side closer to the vehicle moves to a position corresponding to the wheel of the vehicle on the front side in the traveling direction. With this configuration, when the attitude of the virtual vehicle is displayed, the state of the rear wheels of the virtual vehicle can be considered to be the same as the state of the front wheels of the vehicle (vehicle itself). Therefore, when the attitude of the virtual vehicle is determined, it is simply necessary to acquire information indicating the position of the right and left front wheels of the virtual vehicle. Compared with when information indicating the positions of all of the wheels of the virtual vehicle is acquired, the processing load for displaying the virtual vehicle can be reduced. In addition, since the virtual vehicle is positioned immediately before the vehicle (vehicle itself), change in attitude of the vehicle can be easily grasped.

The controller of the periphery monitoring apparatus may display, on the display device, a peripheral image viewed from a position of the virtual vehicle when the virtual vehicle exists at a position a predetermined distance ahead in the traveling direction of the vehicle. With this configuration, the peripheral condition (future peripheral condition) when the vehicle (vehicle itself) moves from the present position to the position of the virtual vehicle can be easily grasped. Therefore, for example, whether to drive the vehicle can be determined more easily at an earlier stage.

A periphery monitoring apparatus according to embodiments of the present invention may comprise: an acquisition unit configured to acquire a guide marker to be superimposed onto an image based on captured image data output from an imager that captures an image of a peripheral region including the traveling direction of the vehicle, the guide marker being in a traveling direction of a vehicle; and a controller configured to superimpose the guide marker onto the image and display the image on a display device, wherein the controller superimposes, as the guide marker, a virtual vehicle corresponding to the vehicle and displays the image on the display device. With this configuration, the expected movement situation of the vehicle associated with the dimensions (vehicle height, vehicle width, and length) of the vehicle (vehicle itself) is easily grasped intuitively.

The acquisition unit of the periphery monitoring apparatus may acquire, as the guide marker, in addition to the virtual vehicle, a path marker indicating an expected traveling direction of a wheel based on a steering angle of the vehicle. With this configuration, the expected traveling direction of the vehicle is easily grasped.

The periphery monitoring apparatus may further comprises a detector configured to detect a roughness state of a road surface in the traveling direction of the vehicle, wherein the controller may display, on the display device, the virtual vehicle in an attitude corresponding to the roughness state of the road surface. With this configuration, the attitude of the vehicle taken when the vehicle travels can be presented in advance with the attitude of the virtual vehicle, so that the road surface situation and the situation where the vehicle travels (shaking state and inclination state) can be grasped more intuitively.

The acquisition unit of the periphery monitoring apparatus may acquire, as the virtual vehicle, a partial virtual vehicle including a wheel on a side far from a wheel of the vehicle on a front side in the traveling direction, the partial virtual vehicle being acquired when a position of a wheel of the virtual vehicle on a side closer to the vehicle moves to a position corresponding to the wheel of the vehicle on the front side in the traveling direction. With this configuration, when the virtual vehicle is displayed, the state of the rear wheels of the virtual vehicle can be considered to be the same as the state of the front wheels of the vehicle (vehicle itself). Therefore, when the position to display the virtual vehicle is determined, it is simply necessary to acquire information indicating the position of the right and left front wheels of the virtual vehicle. Compared with when information indicating the positions of all of the wheels of the virtual vehicle is acquired, the processing load for displaying the virtual vehicle can be reduced. In addition, since the virtual vehicle is positioned immediately before the vehicle (vehicle itself), how the state (for example, attitude) of the vehicle is changing can be easily grasped.

The controller of the periphery monitoring apparatus may display, on the display device, a peripheral image viewed from a position of the virtual vehicle when the virtual vehicle exists at a position a predetermined distance ahead in the traveling direction of the vehicle. With this configuration, the peripheral situation (future peripheral situation) at the time when the vehicle (vehicle itself) moves from the present position to the position of the virtual vehicle can be easily grasped. Therefore, for example, determination of whether to drive the vehicle can be performed more easily at an earlier stage.

The controller of the periphery monitoring apparatus may display, on the display device, a course of the virtual vehicle moving over a predetermined distance along a predicted path on which the vehicle is expected to move. With this configuration, not only the attitude at a position at a predetermined distance from the vehicle (vehicle itself) but also the moving state (for example, traveling attitude) of the vehicle until the virtual vehicle reaches the position is easily grasped intuitively.

The controller of the periphery monitoring apparatus may display the virtual vehicle on the display device in a display manner that the virtual vehicle travels in a direction in which the vehicle is expected to move. With this configuration, the display that facilitates understanding of the moving state of the virtual vehicle can be provided.

The controller of the periphery monitoring apparatus may display a vehicle image indicating a present position of the vehicle on the display device and displays the virtual vehicle on the display device in a display manner that the virtual vehicle travels to separate from the vehicle image. With this configuration, since the vehicle image and the virtual vehicle are displayed at the same time, for example, it is easier to understand that the virtual vehicle is displayed by predicting the moving state relative to the position of the vehicle (vehicle itself).

The controller of the periphery monitoring apparatus may stop movement of the virtual vehicle at a position where a predetermined stop condition is satisfied. With this configuration, since the virtual vehicle being displayed and moving is stopped halfway, the user can recognize the relative relation of the virtual vehicle to the road surface or the peripheral situation and the attitude at the stop position and grasp the situation at the movement position in the future more easily.

The controller of the periphery monitoring apparatus may determine that the predetermined stop condition is satisfied when a stop operation input signal is received. With this configuration, when the virtual vehicle is displayed and moving, the user can stop the virtual vehicle at a desired position and can easily examine the relative relation of the virtual vehicle to the road surface and the peripheral situation and the attitude at that time.

The controller of the periphery monitoring apparatus may determine whether the predetermined stop condition is satisfied based on information on an object that presents in a traveling direction of the virtual vehicle and contacts with the vehicle. With this configuration, whether there is a possibility of contacting with an object present in the traveling direction is determined based on information on the object, and whether to stop moving the virtual vehicle is determined. As a result, it is easier to recognize whether traveling after the position where the virtual vehicle is displayed so as to stop is preferable. When the virtual vehicle is displayed so as to stop, the relative relation of the virtual vehicle to the road surface and the peripheral situation and the attitude at the stop position are easily examined.

When the guide marker is displayed in a display manner that follows a roughness state of a road surface, the controller of the periphery monitoring apparatus may displays, together with the guide marker, a reference marker indicating a flat state where the road surface is flat. With this configuration, a reference marker indicating a flat state is compared with the guide marker to make it easier to grasp the state of the guide marker, for example, the roughness state and the inclination state, thereby facilitating intuitive grasp of the road surface state.

DESCRIPTION OF EMBODIMENTS

Exemplary embodiments of the present invention are disclosed below. The configuration of embodiments illustrated below and the operation, result, and effects achieved by the configuration are provided by way of example. The present invention can be implemented by a configuration other than those disclosed in the following embodiments and provides at least one of a variety of effects based on the basic configuration and derivative effects thereof.

In the present embodiment, a vehicle 1 equipped with a periphery monitoring apparatus (periphery monitoring system) may be, for example, an automobile having a not-illustrated internal combustion engine as a drive source, that is, an engine car, or may be an automobile having a not-illustrated electric motor as a drive source, that is, an electric vehicle or a fuel cell vehicle. The vehicle 1 may be a hybrid car having both as drive sources or may be an automobile having any other drive source. The vehicle 1 may be equipped with a variety of transmission devices and may be equipped with a variety of devices, for example, systems and parts necessary for driving an internal combustion engine or an electric motor. The vehicle 1 is, for example, a vehicle suitable for not only "on-road" (mainly paved road or equivalent road) driving but also "off-road" (mainly not-paved rough road and the like) driving. As for the driving system, the vehicle 1 may be a four-wheel drive vehicle in which driving force is conveyed to all of four wheels 3 and all of the four wheels are driving wheels. The system, number, layout, etc. of the device for driving the wheels 3 can be set in various ways. For example, the vehicle is mainly directed to "on-road" driving. The driving system is not limited to four-wheel drive and may be, for example, front-wheel drive or rear-wheel drive.

Figure 1:
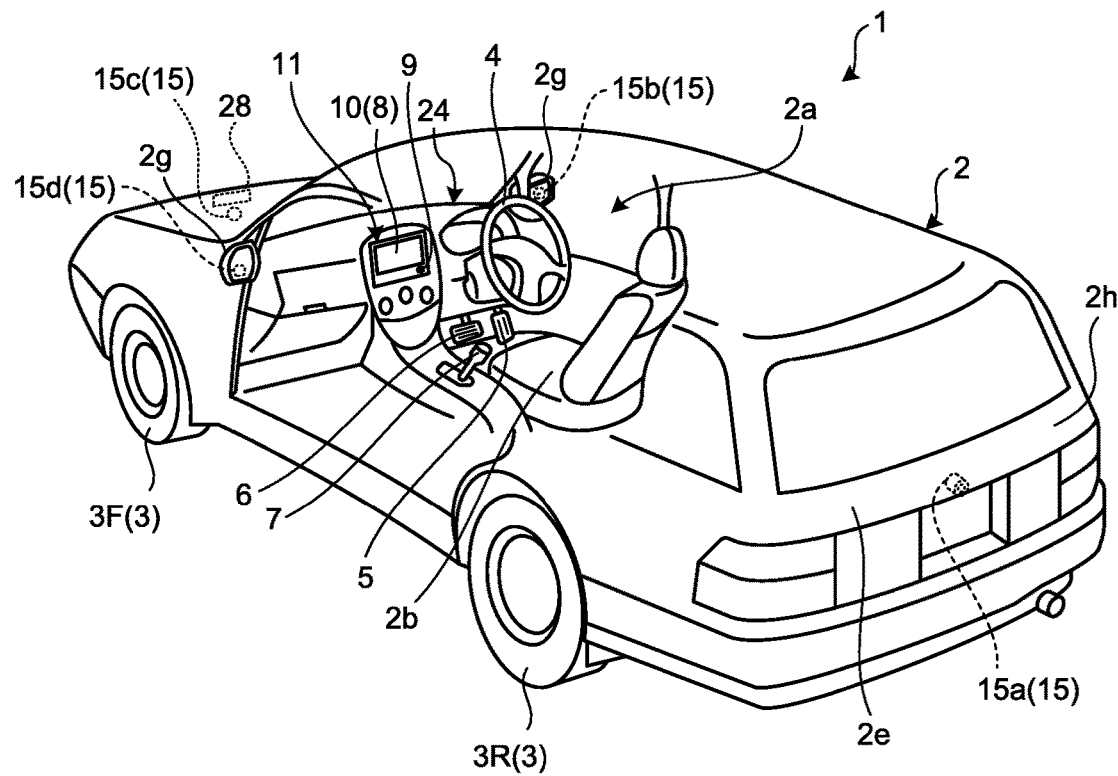
FIG. 1 is a perspective view of an example of a vehicle equipped with a periphery monitoring apparatus according to embodiments with its interior partially exposed.

As illustrated in FIG. 1, a body 2 forms a vehicle interior 2a in which a not-illustrated passenger rides. In the vehicle interior 2a, a steering unit 4, an acceleration operating unit 5, a brake operating unit 6, a transmission operating unit 7, and the like are provided so as to face a seat 2b for the driver as a person who rides in the vehicle. The steering unit 4 is, for example, a steering wheel protruding from a dashboard 24. The acceleration operating unit 5 is, for example, an accelerator pedal positioned at the driver's foot. The brake operating unit 6 is, for example, a brake pedal positioned at the driver's foot. The transmission operating unit 7 is, for example, a shift lever protruding from a center console. The steering unit 4, the acceleration operating unit 5, the brake operating unit 6, the transmission operating unit 7, and the like are not limited to the above.

In the vehicle interior 2a, a display device 8 and an audio output device 9 are provided. The display device 8 is, for example, a liquid crystal display (LCD) or an organic electroluminescent display (OELD). The audio output device 9 is, for example, a speaker. The display device 8 is covered with, for example, a transparent operation input unit 10 such as a touch panel. A person riding in the vehicle can view an image appearing in a display screen of the display device 8 through the operation input unit 10. The person riding in the vehicle can perform operation input by touching, pressing, or moving the operation input unit 10, for example, with a finger at a position corresponding to an image appearing in the display screen of the display device 8. The display device 8, the audio output device 9, the operation input unit 10, and the like are provided, for example, in a monitor device 11 positioned at the center in the vehicle width direction, that is, the right-left direction of the dashboard 24. The monitor device 11 may include a not-illustrated operation input part such as switch, dial, joystick, and push button. A not-illustrated audio output device may be provided at another position in the vehicle interior 2a different from the monitor device 11, and sound may be output from an audio output device different from the audio output device 9 of the monitor device 11. The monitor device 11 may be shared with, for example, a navigation system or an audio system.

Figure 2:
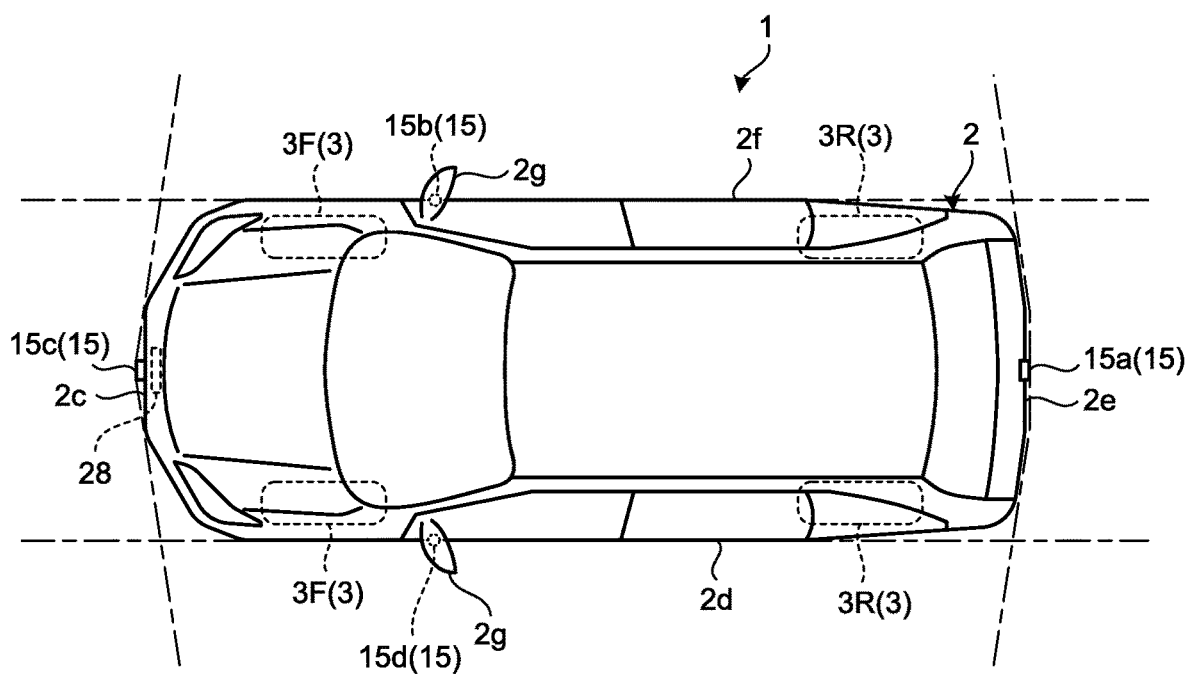
FIG. 2 is a plan view illustrating an example of the vehicle equipped with the periphery monitoring apparatus according to embodiments.
Figure 3:
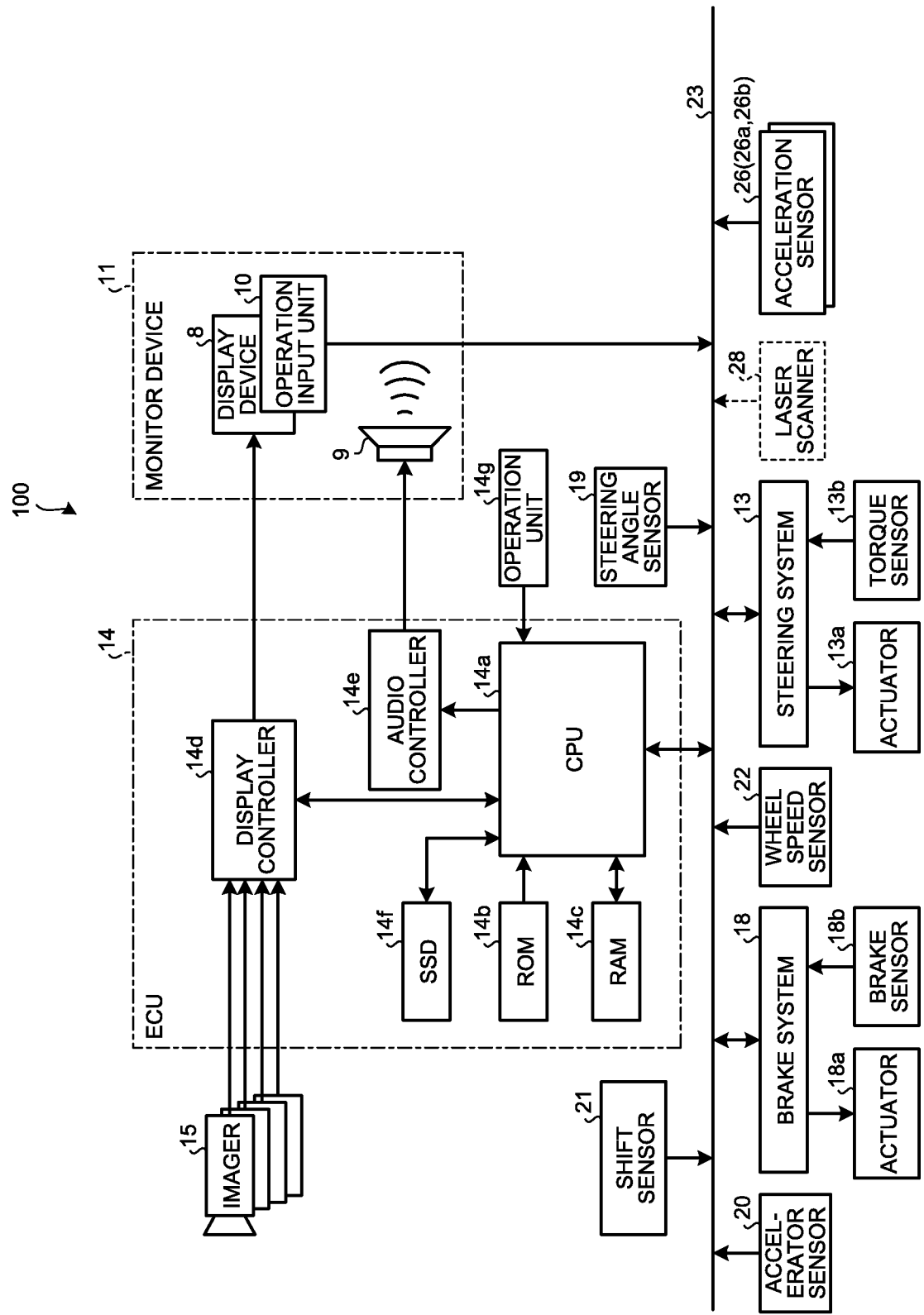
FIG. 3 is a block diagram illustrating an example of a periphery monitoring system including the periphery monitoring apparatus according to embodiments.

As illustrated in FIG. 1 and FIG. 2, the vehicle 1 is, for example, a four-wheel automobile and has right and left two front wheels 3F and right and left two rear wheels 3R. All the four wheels 3 are configured to be steered. As illustrated in FIG. 3, the vehicle 1 includes a steering system 13 that steers at least two wheels 3. The steering system 13 includes an actuator 13a and a torque sensor 13b. The steering system 13 is electrically controlled by, for example, an ECU 14 (electronic control unit) to operate the actuator 13a. The steering system 13 is, for example, an electric power steering system or a steer by wire (SBW) system. The steering system 13 compensates for a steering force by adding torque, that is, adding assist torque to the steering unit 4 with the actuator 13a or steers the wheels 3 with the actuator 13a. In this case, the actuator 13a may steer one wheel 3 or may steer a plurality of wheels 3. The torque sensor 13b detects, for example, torque that the driver gives to the steering unit 4.

As an example, the periphery monitoring apparatus (periphery monitoring system) in the present embodiment superimposes a guide marker, which is displayed in a manner that follows a roughness state of the road surface, onto an image based on captured image data output from an imager 15 capturing an image of a peripheral region including the traveling direction of the vehicle 1. The guide marker includes, for example, a path marker (tire track line, or predicted path) indicating the expected traveling direction of the wheels 3 based on the steering angle of the vehicle 1, and a virtual vehicle that looks traveling ahead on the road surface in front of the vehicle 1. The periphery monitoring apparatus acquires information (three-dimensional information) on a roughness (gradient) state of the road surface in the traveling direction of the vehicle 1 and determines, for example, the shape of the path marker and the attitude of the virtual vehicle as guide markers to be displayed on the display device 8, thereby allowing the user (user or driver) to intuitively grasp the shape of the road surface that the user will drive on and the attitude of the vehicle 1 passing through the road surface. In the present embodiment, the roughness state of the road surface includes, for example, significant change in roughness with rocks and depressions such as off-road and slight change in roughness such as on-road.

As illustrated in FIG. 2, the body 2 is provided with, for example, four imagers 15a to 15d as a plurality of imagers 15. The imagers 15 are, for example, digital cameras containing imaging devices such as charge coupled devices (CCDs) or CMOS image sensors (CISs). The imagers 15 can output moving image data (captured image data) at a predetermined frame rate. The imagers 15 each have a wide-angle lens or a fish-eye lens and can capture an image in a range of, for example, 140° to 220° in a horizontal direction. The optical axes of the imagers 15 may be set obliquely downward. The imagers 15 thus successively capture images of the outside environment including a road surface on which the vehicle 1 can move and an object (obstacle, rock, depression, etc.) in the periphery and output the captured image data.

The imager 15a is positioned, for example, at an end portion 2e on the rear side of the body 2 and provided on a wall below the rear window of a rear hatch door 2h. The imager 15b is positioned, for example, at an end portion 2f on the right side of the body 2 and is provided at a door mirror 2g on the right side. The imager 15c is positioned, for example, at the front side of the body 2, that is, at an end portion 2c on the front side in the vehicle front-back direction and provided at, for example, the front bumper or the front grille. The imager 15c may be disposed on, for example, the back surface (the surface facing the windshield) of the rear-view mirror in the vehicle interior 2a. In this case, the imaging range of the imager 15c is preferably set so as to come within the wiping range of the wipers. The imager 15d is positioned, for example, on the left side of the body 2, that is, at an end portion 2d on the left side in the vehicle width direction and provided at a door mirror 2g on the left side. The ECU 14 included in a periphery monitoring system 100 performs computation and image processing based on the captured image data obtained by a plurality of imagers 15 to generate an image in a wider view angle or generate a virtual overhead image of the vehicle 1 viewed from above. The ECU 14 also performs computation and image processing of data of a wide-angle image obtained by the imagers 15 to generate a cut-out image of a specific region, generate image data representing only a particular region, or generate image data with only a particular region highlighted. The ECU 14 can convert the captured image data into virtual image data as if it is captured from a point of view (virtual point of view) different from the point of view from which the imagers 15 capture an image (view point conversion). The ECU 14 can display the acquired image data on the display device 8 to provide periphery monitoring information, for example, to ensure the safety on the right and the left to the vehicle 1 or ensure the safety in the periphery in a perspective view of the vehicle 1.

As described above, the ECU 14 in the present embodiment displays a guide marker in a display manner that follows a roughness state of the road surface (three-dimensional shape) on the display device 8. The three-dimensional shape of the road surface can be detected by a variety of methods. For example, a stereo camera may be used to simultaneously capture an image of an object with two imagers (cameras) and detect the position and the three-dimensional shape of the object from the difference in position (parallax) on the images of the object obtained by the cameras. Therefore, when the roughness information of the road surface ahead of the vehicle 1 is obtained, the imager 15c may be a stereo camera. In this case, the imager 15c can capture a peripheral image on which a guide marker is to be superimposed and acquire shape information (three-dimensional information) of the road surface included in the peripheral image. As another embodiment for detecting a roughness state of the road surface (stereoscopic information, three-dimensional information), a laser scanner 28 may be used. In this case, the imager 15c may be a monocular camera to capture a peripheral image on which a guide marker is to be superimposed. The guide marker determined based on the roughness information of the road surface acquired by the laser scanner 28 is then superimposed on the image acquired by the imager 15c that is a monocular camera.

The image acquired by the imager 15c that is a monocular camera may be processed based on the roughness information of the road surface acquired by the laser scanner 28 so that part or the whole of the road surface may be three-dimensionally displayed. When the roughness state (stereoscopic information, three-dimensional information) of the road surface behind the vehicle 1 is detected, the imager 15a may be a stereo camera, or a laser scanner 28 having a detection range behind the vehicle 1 may be provided. The laser scanner 28 and the stereo camera may be used in combination. In this case, the roughness state of the road surface can be detected with higher accuracy.

As illustrated in FIG. 3, in the periphery monitoring system 100 (periphery monitoring apparatus), in addition to the ECU 14, the monitor device 11, and the steering system 13, a brake system 18, a steering angle sensor 19, an accelerator sensor 20, a shift sensor 21, a wheel speed sensor 22, an acceleration sensor 26 (26a, 26b) and the like are electrically connected through an in-vehicle network 23 as an electrical communication circuit. The in-vehicle network 23 is configured as, for example, a controller area network (CAN). The ECU 14 can send a control signal through the in-vehicle network 23 to control the steering system 13, the brake system 18, and the like. The ECU 14 can receive a detection result from a torque sensor 13b, a brake sensor 18b, the steering angle sensor 19, the accelerator sensor 20, the shift sensor 21, the wheel speed sensor 22, the acceleration sensor 26, etc. and an operation signal from the operation input unit 10, etc. through the in-vehicle network 23. When the imager 15c is a monocular camera, the laser scanner 28 is connected to the in-vehicle network 23 so that the ECU 14 can detect a roughness state of the road surface based on the detection result of the laser scanner 28.

The ECU 14 includes, for example, a central processing unit (CPU) 14a, a read only memory (ROM) 14b, a random access memory (RAM) 14c, a display controller 14d, an audio controller 14e, and a solid state drive (SSD, flash memory) 14f. The CPU 14a performs, for example, a variety of computation and processing, such as image processing related to an image displayed on the display device 8, computation of guide markers (path marker, virtual vehicle) indicating a road surface state in the expected traveling direction of the vehicle 1 and the attitude of the vehicle 1 traveling on the road surface, calculation of a road surface roughness (gradient) state, and guide (notification) processing for calling attention to a roughness state of the road surface. The CPU 14a reads a program stored (installed) in a nonvolatile storage device such as the ROM 14b to perform computation in accordance with the program.

The RAM 14c temporarily stores a variety of data for use in computation in the CPU 14a. Of the computation processing in the ECU 14, the display controller 14d mainly performs image processing using the captured image data obtained by the imager 15 and image processing (as an example, image combine) of image data to be displayed on the display device 8. Of the computation processing in the ECU 14, the audio controller 14e mainly performs processing of audio data to be output from the audio output device 9. The SSD 14f is a rewritable nonvolatile memory and can store data even when the ECU 14 is powered off. The CPU 14a, the ROM 14b, the RAM 14c, and the like can be integrated in the same package. The ECU 14 may include other logic processors or logic circuits such as a digital signal processor (DSP), instead of the CPU 14a. A hard disk drive (HDD) may be provided instead of the SSD 14f, or the SSD 14f and the HDD may be provided separately from the ECU 14 for periphery monitoring.

The brake system 18 is, for example, an anti-lock brake system (ABS) for preventing locking during braking, an electronic stability control (ESC) for preventing skidding of the vehicle 1 during cornering, an electric brake system for enhancing braking force (performing brake assist), and a brake by wire (BBW). The brake system 18 applies a braking force to the wheels 3 and thus to the vehicle 1 through an actuator 18a. The brake system 18 can detect signs of brake locking, free spin of the wheels 3, and skidding from the rotation difference between the right and left wheels 3 to execute a variety of control. The brake sensor 18b is, for example, a sensor that detects the position of a movable part (for example, brake pedal) of the brake operating unit 6. The brake sensor 18b includes a displacement sensor.

The steering angle sensor 19 is, for example, a sensor that detects the amount of steering of the steering unit 4 such as a steering wheel. The steering angle sensor 19 is configured with, for example, a Hall element. The ECU 14 acquires, for example, the amount of steering of the steering unit 4 by the driver and the amount of steering of the wheels 3 during automatic steering from the steering angle sensor 19 to perform a variety of control. The steering angle sensor 19 detects the angle of rotation of a rotational part included in the steering unit 4. The steering angle sensor 19 is an example of angle sensor. When a path marker is displayed as a guide marker, the detection result of the steering angle sensor 19 may also be used to determine the direction of the path marker.

The accelerator sensor 20 is, for example, a sensor that detects the position of a movable part (for example, accelerator pedal) of the acceleration operating unit 5. The accelerator sensor 20 includes a displacement sensor.

The shift sensor 21 is, for example, a sensor that detects the position of a movable part of the transmission operating unit 7. The shift sensor 21 may detect the position of a lever, an arm, a button, and the like serving as movable parts. The shift sensor 21 may include a displacement sensor or may be configured as a switch.

The wheel speed sensor 22 is a sensor that detects the amount of rotation or the number of revolutions per unit time of the wheels 3. The wheel speed sensor 22 is disposed at each wheel 3 and outputs a wheel speed pulse number indicating the number of revolutions detected in each wheel 3 as a sensor value. The wheel speed sensor 22 may be configured, for example, with a Hall element. The ECU 14 computes the amount of movement of the vehicle 1 based on the sensor value acquired from the wheel speed sensor 22 to perform a variety of control. When the vehicle speed of the vehicle 1 is calculated based on the sensor value of each wheel speed sensor 22, the ECU 14 determines the vehicle speed of the vehicle 1, based on the speed of the wheel 3 with the smallest sensor value of the four wheels, to perform a variety of control. When there exists a wheel 3 with a sensor value larger than other wheels 3 of the four wheels, for example, when there exists a wheel 3 with the number of revolutions per unit period (unit time or unit distance) greater than the other wheels 3 by a predetermined number, the ECU 14 regards the wheel 3 as being in a slip state (spin state) and performs a variety of control. The wheel speed sensor 22 may be provided in the brake system 18. In this case, the ECU 14 acquires the detection result of the wheel speed sensor 22 through the brake system 18.

The vehicle 1 is provided with, for example, two acceleration sensors 26 (26*a*, 26*b*). The ECU 14 calculates the inclination in the front-back direction (pitch angle) and the inclination in the right-left direction (roll angle) of the vehicle 1, based on a signal from the acceleration sensors 26 (26*a*, 26*b*). The pitch angle is the angle indicating the inclination about the right-left axis of the vehicle 1. The pitch angle is zero degree when the vehicle 1 is on a horizontal plane (ground, road surface). The roll angle is the angle indicating the inclination about the front-back axis of the vehicle 1. The roll angle is zero degree when the vehicle 1 is on a horizontal plane (ground, road surface). That is, it can be detected whether the vehicle 1 is on a horizontal road surface or on an inclined plane (uphill road surface or downhill road surface). When the vehicle 1 is equipped with an ESC, the acceleration sensor conventionally installed in the ESC may be used. The present embodiment is not intended to limit the acceleration sensor 26, and any sensor that can detect the acceleration in the front-back and right-left directions of the vehicle 1 may be used.

In order to detect a roughness state of the road surface, the laser scanner 28 may be included. The laser scanner 28 is provided, for example, at the front end of the body 2 (the end portion 2*c* on the front side in the vehicle front-back direction) and acquires state information indicating a state of the road surface in the traveling direction of the vehicle 1. In the laser scanner 28, laser light emitted from a light source (for example, laser diode) in the sensor is reflected when impinging on a measurement target (for example, road surface or three-dimensional object), and received by a light-receiving element. The reflected light received is evaluated and computed, whereby the distance to the position where laser light is reflected is calculated. As a result, the ECU 14 acquires a state of a road surface, for example, relative state information (for example, roughness information, relative inclination) of the road surface ahead of the vehicle 1 relative to the road surface on which the vehicle 1 is present, such as whether roughness (gradient) exists, the location where roughness is present (roughness position), the magnitude of roughness (gradient value), and the state of roughness (gradient) (uphill, downhill).

The configuration, arrangement, and electrical connection of the sensors and the actuators described above are illustrated by way of example and can be set (modified) in various ways.

Figure 4:
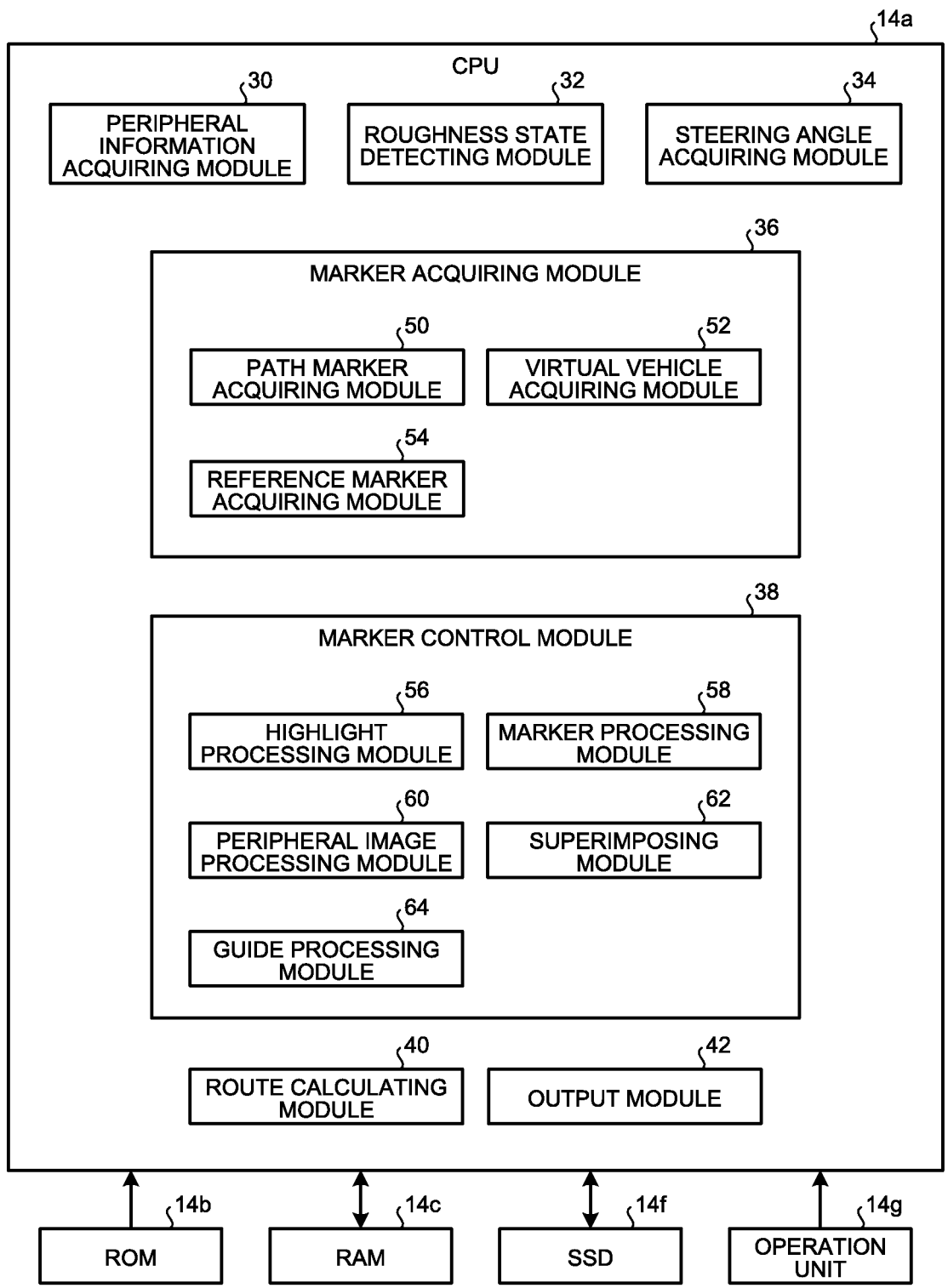
FIG. 4 is a block diagram illustrating an exemplary configuration of a controller (CPU) for displaying a guide marker that is implemented in an ECU in the periphery monitoring apparatus according to embodiments.

In order to provide display of guide markers as described above, as illustrated in FIG. 4, the CPU 14*a* included in the ECU 14 includes a peripheral information acquiring module 30, a roughness state detecting module 32, a steering angle acquiring module 34, a marker acquiring module 36, a marker control module 38, a route calculating module 40, and an output module 42. The marker acquiring module 36 includes a path marker acquiring module 50, a virtual vehicle acquiring module 52, and a reference marker acquiring module 54. The marker control module 38 includes a highlight processing module 56, a marker processing module 58, a peripheral image processing module 60, an superimpose module 62, and a guide processing module 64. These modules can be implemented by reading and executing a program installed and stored in a storage device such as the ROM 14*b*.

The peripheral information acquiring module 30 acquires information on a peripheral region in the traveling direction of the vehicle 1 and temporarily stores the acquired information, for example, in the RAM 14*c*. In this case, when the imager 15*c* disposed at the front of the vehicle 1 is a stereo camera, the peripheral information acquiring module 30 acquires the captured image data representing a peripheral image and three-dimensional information included in the captured region from the imager 15*c* through the display controller 14*d*. Here, the peripheral information acquiring module 30 acquires two two-dimensional images (captured image data) having parallax captured by the stereo camera and acquires three-dimensional information of the captured region based on the parallax between the two two-dimensional images. When the imager 15*c* is a monocular camera and the laser scanner 28 is included, the peripheral information acquiring module 30 acquires the captured image data representing a peripheral image from the imager 15*c* through the display controller 14*d* and acquires three-dimensional information in a detection region ahead of the vehicle 1 from the laser scanner 28 through the in-vehicle network 23. When an image around the vehicle 1 is displayed alone on the display device 8, the display controller 14*d* may output the captured image data captured by the imager 15 as it is to the display device 8. The CPU 14*a* may allow the user to select display content as desired using an input device such as an operation unit 14*g* disposed in the vicinity of the operation input unit 10 or the steering unit 4. That is, the display controller 14*d* can display an image selected through operation of the operation input unit 10 or the operation unit 14*g*. For example, an image behind the vehicle 1 captured by the imager 15*a* may be displayed on the display device 8, or a left-side image captured by the imager 15*d* may be displayed.

The roughness state detecting module 32 detects a roughness state of, for example, a region (for example, road surface) ahead of the vehicle 1 based on the three-dimensional information acquired by the peripheral information acquiring module 30. When the imager 15*c* is a stereo camera, the acquired captured image data includes three-dimensional information having height information, for each region on the captured image data, and the roughness state detecting module 32 extracts the height information associated with each region and retains the height information, for example, in the RAM 14c. In this case, the image based on the captured image data is a three-dimensional image and can be displayed such that the roughness (roughness resulting from rocks or structures) of the road surface can be easily recognized, compared with a two-dimensional image based on the captured image data acquired when the imager 15c is a monocular camera. When the imager 15c is a monocular camera and the laser scanner 28 is included, the roughness state detecting module 32 retains the height information of a region (for example, road surface) ahead of the vehicle 1 in association with each region on the image (two-dimensional image) based on the captured image data acquired by the imager 15c, for example, in the RAM 14c, based on the three-dimensional information acquired from the laser scanner 28.

The steering angle acquiring module 34 acquires information (steering angle) on the operation state of the steering unit 4 (steering wheel) output from the steering angle sensor 19. That is, the steering angle in the direction in which the driver is about to drive the vehicle 1 is acquired. The steering angle acquiring module 34 may acquire whether the vehicle 1 can move forward or backward, based on the position of a movable part of the transmission operating unit 7 acquired from the shift sensor 21, so that whether the steering angle is a steering angle in the forward state or a steering angle in the backward state can be identified.

The marker acquiring module 36 includes the path marker acquiring module 50, the virtual vehicle acquiring module 52, and the reference marker acquiring module 54. The path marker acquiring module 50, the virtual vehicle acquiring module 52, and the reference marker acquiring module 54 acquire data about each guide marker in a basic shape before it is displayed in a display manner that follows a roughness state in order to facilitate recognition of, for example, a roughness state of the road surface ahead of the vehicle 1.

The path marker acquiring module 50 acquires, from the ROM 14b or the SSD 14f, a path marker (tire track line) extending in the direction (the direction in which the front wheels 3F are oriented) based on the present steering angle of the vehicle 1 acquired by the steering angle acquiring module 34. In this case, the path marker may be lines that are substantially straight lines and cross each other at a long distance from the vehicle 1.

The virtual vehicle acquiring module 52 acquires, from the ROM 14b or the SSD 14f, data about a virtual vehicle that simulates the vehicle attitude when the vehicle 1 travels along the path marker. The virtual vehicle is displayed, for example, at a position corresponding to a predetermined distance (for example, three meters ahead) ahead of the vehicle 1, without changing the relative distance to the vehicle 1. In this case, the virtual vehicle acquiring module 52 may select and display one kind of virtual vehicle having a predetermined size corresponding to the position (distance) ahead. In another embodiment, the virtual vehicle may be displayed while its relative position to the vehicle 1 is changed, for example, so as to go away from the vehicle 1 as the start position. In this case, the virtual vehicle acquiring module 52 can successively display different kinds of virtual vehicles with decreasing sizes according to the elapsed time (moving distance) from the start of movement such that the virtual vehicle looks away from the vehicle 1. One kind of virtual vehicle may be selected so that the marker processing module 58 performs the process of reducing the size of the virtual vehicle in accordance with the elapsed time (moving distance).

It is preferable that when data of the virtual vehicle retained in the ROM 14b or the SSD 14f is displayed together with the vehicle 1 (vehicle itself) image on a screen 8a, the vehicle 1 and the virtual vehicle are easily distinguished from each other, and the color of the virtual vehicle may be different from the color of the vehicle 1. For example, when the vehicle 1 is blue, the virtual vehicle may be pale blue. When the vehicle 1 is white, the virtual vehicle may be yellow. The color of the virtual vehicle is not limited thereto and may be changed as appropriate depending on the color of the vehicle 1. Alternatively, the color of the virtual vehicle may be selected by the user, for example, through the operation input unit 10. Similarly, the virtual vehicle may be represented diagrammatically only by outline (vehicle frame) to facilitate distinction between the vehicle 1 and the virtual vehicle. In this case, the user can easily recognize that the outline is the virtual vehicle and easily recognize the road surface state and the presence/absence of an obstacle since the virtual vehicle does not hide the region around the vehicle 1.

The virtual vehicle acquiring module 52 may acquire a virtual vehicle having a shape (size) corresponding to the vehicle 1 (the vehicle height, vehicle width, and length of the vehicle itself) on the screen 8a, irrespective of whether a path marker is displayed. The acquired virtual vehicle then may be superimposed on the peripheral image appearing on the screen 8a. Such a virtual vehicle is displayed to indicate the predicted moving state of the vehicle 1, considering the size of the vehicle 1 (vehicle itself). In this case, for example, when the vehicle 1 moves three meters ahead of the present location, where in the road surface each wheel 3 of the vehicle 1 exists can be indicated. As a result, the user can easily intuitively grasp the predicted moving state of the vehicle 1 (vehicle itself). Also in this case, it is preferable that the display size of the virtual vehicle on the screen 8a is changed according to the distance from the vehicle 1 (vehicle itself).

The reference marker acquiring module 54 acquires, from the ROM 14b or the SSD 14f, a guide marker displayed in a display manner that follows a roughness state of the road surface and data about a reference marker superimposed on the peripheral image. The reference marker is a marker indicating a flat state of a road surface if the road surface is flat. The reference marker is a marker serving as a comparative reference to facilitate understanding of the shape and the degree of attitude change when the path marker acquired by the path marker acquiring module 50 and/or the virtual vehicle acquired by the virtual vehicle acquiring module 52 is displayed in a display manner that follows a roughness state of the road surface. The reference marker is, for example, a linear marker extending far beyond relative to the position of the vehicle 1 and may be a fixed marker that does not change irrespective of the steering angle acquired by the steering angle acquiring module 34. In this case, it is possible to avoid moving of the reference marker in conjunction with a path marker or a virtual vehicle of which display position changes with the steering angle, and thus the visibility of those markers can be improved. In another embodiment, a reference marker extending in a direction corresponding to the steering angle acquired by the steering angle acquiring module 34 may be selected. In this case, since the reference marker and the path marker or the virtual vehicle always move in conjunction with each other, the reference marker and the path marker or the virtual vehicle can be displayed in proximity to each other. As a result, the comparison between the reference marker and the path marker or the virtual vehicle is easy, thereby facilitating recognition of the degree of change of the path marker or the virtual vehicle according to a roughness state of the road surface.

The marker control module 38 performs processing on a guide marker (path marker and/or virtual vehicle) acquired by the marker acquiring module 36.

The highlight processing module 56 performs a highlighting process on a region of a road surface indicating a roughness state equal to or greater than a predetermined threshold. For example, when the gradient of a road surface is a predetermined threshold (for example, 30° or greater) relative to the position where the vehicle 1 exists at present, a highlighting process is performed, for example, to surround the region with a red mark, to allow a mark surrounding the region to blink, or to make the brightness of the region higher than the peripheral region. This highlighting process may be performed on an image based on the captured image data acquired by the imager 15c or may be performed on a path marker acquired by the path marker acquiring module 50. For example, when the path marker passes through a region with a gradient exceeding a predetermined threshold, the display color of the path marker in the corresponding portion is displayed in red so as to call attention, or the portion of the path marker passing through the region may be displayed so as to blink. The highlighting process may be performed automatically by the highlight processing module 56, based on three-dimensional information detected by the roughness state detecting module 32, or may be performed by the highlight processing module 56 when the user makes a highlight display request through the operation input unit 10 or the operation unit 14g.

The highlight processing module 56 performs a highlighting process on the virtual vehicle acquired by the virtual vehicle acquiring module 52. For example, when a place that requires attention exists relative to the position where the vehicle 1 exists at present, for example, when the gradient of the road surface is equal to or greater than a predetermined threshold (for example, 30° or greater), attention to the region is called. When one of the right and left wheels 3 drives onto a rock, the vehicle 1 may tilt greatly in the roll direction because of the difference in height between the right and left wheels 3. Similarly, when one of the front and rear wheels 3 drives onto a rock, the vehicle 1 may tilt greatly in the pitch direction because of the difference in height between the front and rear wheels 3. In this way, when the vehicle tilts with a state of the wheel touching the ground and the tilt angle of the vehicle is equal to or greater than a predetermined threshold (for example, 30° or greater), the highlight processing module 56 may perform a highlighting process on the virtual vehicle to call attention. For example, when the virtual vehicle exists at a position corresponding to the region requiring attention or passes through the region, and the virtual vehicle tilts greatly, the virtual vehicle is highlighted. The highlight processing module 56 performs, for example, red display, blinking display, or high-brightness display of the virtual vehicle. As a result, the user can easily recognize that there is a region that requires caution. In the case where the virtual vehicle is displayed so as to be fixed at a predetermined position ahead of the vehicle 1 (vehicle itself), the highlight processing module 56 cancels the highlight display when the fixed display position of the virtual vehicle moves and comes out of the region requiring attention as the vehicle 1 moves. Similarly, in the case where the virtual vehicle is displayed so as to travel away from the vehicle 1 (vehicle itself), the highlight processing module 56 cancels the highlight display when the virtual vehicle passes through (comes out of) the region requiring attention. In this case, the dimensions of the region requiring attention can be recognized from the length of the period of time of highlight display. For example, the user can easily determine whether the user can pass through a steep zone for a moment or the zone continues for a while. The highlight processing module 56 may provide highlight display similarly also when the virtual vehicle contacts with an obstacle or when there is a possibility of the contact. In this case, the user can be notified of danger in advance. In another embodiment, at the position where the virtual vehicle is highlighted, the virtual vehicle may be divided into two, one of which may be displayed so as to be fixed and the other may be displayed so as to keep moving. In this case, the display color of the virtual vehicle kept moving may be different from the display color of the virtual vehicle fixed. Such display in a divided manner can make it easier to recognize the section that requires caution and determine the situation if the vehicle keeps traveling. The virtual vehicle displayed so as to be fixed may be kept or may be hidden after a predetermined period (time) has passed. In this case, the display may be gradually hidden or may be hidden promptly.

When the virtual vehicle is displayed at a distance from the vehicle 1 (vehicle itself), the highlight processing module 56 may highlight at least part of the virtual vehicle in accordance with the relation with the periphery at that time (for example, the relation with an obstacle). For example, when the door is inaccessible (less accessible) at the place where the virtual vehicle moves prior to the vehicle 1, for example, when the door interferes with or too close to an obstacle, the door is highlighted. For example, red display, blinking display, or high-brightness display of the door is provided. The virtual vehicle's door and the periphery, for example, the presence of an obstacle or the distance to an obstacle can be recognized, for example, by analyzing the captured image data (stereo image data) captured by the imagers 15 or analyzing the detection result of the laser scanner 28. In this case, the user can easily recognize the presence of an inaccessible (less accessible) door in advance so that the user can easily select, for example, a parking location. As described above, it is preferable that the door is highlighted only when opening and closing of the door is necessary. Therefore, the highlight processing module 56 may highlight the door only when a parking location is designated, for example, through the operation input unit 10. The door includes a door on a side surface of the vehicle for a person to get on and off and the rear hatch door 2h (see FIG. 1). The types of door include hinged door and slide door.

The marker processing module 58 changes the path marker so as to follow a roughness state of the road surface when the path marker acquired by the path marker acquiring module 50 is displayed in a direction based on the steering angle acquired by the steering angle acquiring module 34. In this case, the marker processing module 58 combines, of the three-dimensional information acquired by the imager 15c (stereo camera) or the laser scanner 28, for example, height information (gradient information) corresponding to the position on which the path marker is to be superimposed on the image acquired by the imager 15c, with display information of the path marker. When the road surface is warped, such information may also be added. As a result, the path marker attains such a shape that follows a roughness state of the road surface at the superimpose position. In another embodiment, the marker processing module 58 can obtain a path marker in display manner that follows a roughness state of the road surface by superimposing the path marker, which is acquired by the path marker acquiring module 50 and is pasted on a planar texture, onto the rough surface of the road surface based on the three-dimensional information. The marker processing module 58 can perform this process every time the steering angle acquired by the steering angle acquiring module 34 changes, thereby moving the path marker that follows a roughness state of the road surface in a direction in which the front wheels 3F are oriented. When the steering angle is changed, the path marker may be updated immediately, or an afterimage of the path marker displayed before the steering angle update may be displayed for a predetermined period and the afterimage may be gradually erased. In this case, the roughness state of the road surface can be displayed for a region in a range wider than the width of the wheels 3, so that the roughness state of the road surface in a wider range can be easily grasped.

The marker processing module 58 can display the virtual vehicle acquired by the virtual vehicle acquiring module 52 such that it is tilted in an attitude that follows a roughness state of the road surface. In this case, the marker processing module 58 acquires height information of a section corresponding to each wheel of the virtual vehicle that contacts with the road surface, from the three-dimensional information acquired by the imager 15c (stereo camera) or the laser scanner 28. The attitude of the virtual vehicle is then changed based on the height information at a position where each wheel contacts with the road surface. As a result, the virtual vehicle can be displayed in an attitude that follows a roughness state of the road surface at the position superimposed. In another embodiment, the marker processing module 58 can obtain a virtual vehicle in a display manner that follows a roughness state of the road surface (attitude) by superimposing the virtual vehicle, which is acquired by the virtual vehicle acquiring module 52 and is pasted on a planar texture, onto a rough surface of the road surface based on the three-dimensional information. In this case, only the attitude of the virtual vehicle is changed, and the body shape is not deformed (distorted). When the virtual vehicle is displayed so as to go away from the vehicle 1, the marker processing module 58 changes the virtual vehicle having a display size corresponding to the elapsed time (distance) since the virtual vehicle appears, into an attitude at a position corresponding to the elapsed time (distance) and superimposes the changed virtual vehicle. When the steering angle acquired by the steering angle acquiring module 34 changes, the superimpose position of the virtual vehicle moves in the vehicle width direction. Therefore, the superimpose process is performed with the attitude at the position being changed, whereby the virtual vehicle in an attitude that follows a roughness state of the road surface can be moved in a direction in which the front wheels 3F are oriented. In the present embodiment, displaying a guide marker (path marker and/or virtual vehicle) in a display manner that follows a roughness state of the road surface does not necessarily mean that the shape of the path marker or the tilt of the virtual vehicle completely follows a roughness state of the road surface. For example, it may follow to such a degree that a change in shape or a change in attitude with a roughness state of the road surface can be identified.

When the virtual vehicle is displayed so as to go away from the vehicle 1 (vehicle itself), the marker processing module 58 can perform a display process for making it clear that the virtual vehicle is moving. For example, when the virtual vehicle goes away from the vehicle 1 (vehicle itself), the transparency can be gradually increased according to the moving distance (time). In this case, the display of the virtual vehicle may gradually fade and finally disappear with a transparency of 100%. In order to indicate that the display of the virtual vehicle is moving, for example, animation may be displayed such that the wheels of the virtual vehicle turn. The virtual vehicle displayed in various ways as described above enables the user to easily recognize whether the virtual vehicle is displayed so as to be fixed at a predetermined distance from the vehicle 1 (vehicle itself) or displayed so as to move, so that the user can easily recognize the content of display more appropriately.

The marker processing module 58 also can change a display manner of the virtual vehicle being displayed. For example, in a case where the virtual vehicle is displayed so as to travel in the direction in which the vehicle 1 (vehicle itself) moves, that is, toward the position that it is expected to reach in the future, the virtual vehicle may be displayed so as to stop when a predetermined stop condition is satisfied. The stop condition is, for example, that the user makes a stop request through the operation input unit 10 or the operation unit 14g. The marker processing module 58 stops the virtual vehicle being displayed so as to move when the stop condition is satisfied. As a result, the user can closely examine the attitude of the virtual vehicle displayed so as to stop and the relation with an obstacle (for example, roughness of rock or road surface) in the periphery. When the virtual vehicle is displayed so as to be fixed at a distance from the vehicle 1, the highlight processing module 56 may display such that the virtual vehicle intermittently moves (for example, move forward) by a predetermined distance through the operation of the operation input unit 10 or the operation unit 14g. For example, when the operation input unit 10 is pressed for a short time (for example, one second or shorter), the virtual vehicle may be moved by a predetermined unit distance, for example, by 0.1 meter. For example, when the operation input unit 10 is pressed and held down (for example, three seconds or longer), the virtual vehicle may be moved by a predetermined long distance (for example, 0.5 meter). For example, while the operation input unit 10 is being held down, the virtual vehicle may keep moving, and the virtual vehicle may be stopped at the position when hold is released. In this way, the display position of the virtual vehicle is adjustable, whereby the user can closely examine the attitude of the vehicle 1 (virtual vehicle) at the position of interest, the relative positional relation with an obstacle in the periphery, and the like, in advance. In this case, the marker processing module 58 may display the detail of the travel distance of the virtual vehicle on the screen 8a (for example, see FIG. 8). For example, the display "move 1.4 meters ahead" may appear so that the user easily imagines the actual distance to the position of interest. In another embodiment, the highlight processing module 56 can stop the virtual vehicle displayed so as to go away from the vehicle 1, at a desired position, using the operation input unit 10 or the operation unit 14g. Also in this case, the user can closely examine the attitude of the vehicle 1 (virtual vehicle) at the position of interest and the relative positional relation to an obstacle in the periphery, through the virtual vehicle displayed so as to stop. As a result, the path of the vehicle 1 can be closely examined in advance, thereby facilitating safer and more efficient driving.

Furthermore, the CPU 14a can detect whether there is a possibility that the virtual vehicle displayed so as to move interferes (for example, contact) with an obstacle (rock, wall, person, animal, other vehicles, etc.), based on the analysis of the captured image data (stereo image data) captured by the imager 15 and/or the detection result of the laser scanner 28. If it is determined that there is a possibility that the virtual vehicle interferes with an obstacle, the highlight processing module 56 determines that a predetermined stop condition is satisfied based on information on the obstacle (the object present in the traveling direction) and may stop the moving display immediately before interference and switch to the fixed display. In this case, the stopping of the virtual vehicle displayed so as to move makes it easier for the user to recognize in advance that there is a possibility of interference with an obstacle if the user keeps driving with the present steering angle. As a result, the user readily selects or changes the path in an earlier stage. The interference (contact) of the virtual vehicle with an obstacle is also avoided on the screen 8*a* so that the user is less likely to feel unusual. When the virtual vehicle is stopped (when switched to the fixed display), the highlight processing module 56 may switch the display of the virtual vehicle to the highlight display. For example, red display, blinking display, or high-brightness display may be performed to facilitate recognition by the user. In another embodiment, the marker processing module 58 may switch to the fixed display at a point of time when the virtual vehicle contacts with an obstacle. Such display of contact can give a stronger impression to the user and call the user's attention.

When the virtual vehicle is displayed so as to move toward a preset parking space, the marker processing module 58 may display the virtual vehicle moving to the parking space with a vehicle-side door or the rear hatch door 2*h* open (such a state in which the door is open during normal use). In this case, the user can easily determine in advance whether the vehicle-side door or the rear hatch door 2*h* can be opened and used without contacting with an obstacle in the periphery when the vehicle 1 is actually parked. For example, when the opened door of the virtual vehicle comes into contact or when ample space fails to be secured, the user may consider changing the parking location in advance. In another embodiment, the virtual vehicle with the oil filler hole open may be displayed, for example, through operation of the operation input unit 10. In this case, when driving toward a fueling space, the user can examine in advance whether oil filling is smooth and can easily correct the moving route earlier in accordance with the movement position of the virtual vehicle. In this case, triggered by opening of the oil filler hole, the image appearing on the screen 8*a* may be switched to an overhead image of the vehicle 1 viewed from above so that the positional relation between the fueling space and the vehicle 1 can be easily confirmed. In this case, the virtual vehicle displayed in the overhead image may also reflect a state of the oil filler hole. That is, the virtual vehicle with the oil filler hole open may be displayed.

When the imager 15*c* is a monocular camera, the peripheral image processing module 60 performs the process of converting the two-dimensional image acquired by the imager 15*c* into a three-dimensional image using the three-dimensional information acquired by the laser scanner 28 (roughness highlighting process). In this case, the peripheral image processing module 60 may convert the entire captured region into a three-dimensional image or may convert only the region to be superimposed with a guide marker, specifically a path marker, into a three-dimensional image. In this case, the processing load can be reduced compared with when the entire captured region undergoes the roughness highlighting process. The roughness highlighting process can be performed by known techniques, for example, coordinate conversion for achieving three dimensions, brightness control, contrast control, and edge processing.

When the virtual vehicle goes far away from the vehicle 1 (travels ahead), the peripheral image processing module 60 can process the image based on the captured image data captured by the imager 15*c*, for example, such that the peripheral image viewed from the driver's seat at the movement position appears on the display device 8. In this case, the landscape in the front direction viewed from the virtual vehicle at a destination is thought to be substantially the same as the landscape in the front direction viewed at the present position of the vehicle 1, except for the enlargement ratio. That is, for example, when a peripheral image viewed from the driver's seat of the virtual vehicle at a destination is displayed on the display device 8, the peripheral image processing module 60 may enlarge an image based on the captured image data acquired by the imager 15*c* in accordance with the distance from the vehicle 1 to the virtual vehicle. The peripheral image processing module 60 may tilt the image in the roll direction or the pitch direction in accordance with the attitude of the virtual vehicle at a destination. The image viewed at the destination to which the virtual vehicle has moved (preceding point of view image, future image) is displayed in this manner, whereby the user can easily grasp the vehicle state when the vehicle 1 travels to the position of the virtual vehicle and can select a path more appropriately in an earlier stage. The image viewed at the destination to which the virtual vehicle has moved (preceding point of view image, future image) may be generated, for example, using a well-known point of view conversion process.

The superimpose module 62 superimposes the guide marker (path marker, virtual vehicle, reference marker, etc.) in a display manner changed by the marker processing module 58 on the image based on the captured image data captured by the imager 15*c*, in accordance with change in steering angle acquired by the steering angle acquiring module 34.

The guide processing module 64 selects a message to be displayed and/or an audio message or a warning sound to be output to call attention when a guide marker is displayed, for example, from the ROM 14*b* or the SSD 14*f*. The guide processing module 64 also selects data for outputting the operation method of the vehicle 1 (operation instructions for the steering unit 4, the acceleration operating unit 5, the brake operating unit 6, etc.), for example, for driving in accordance with the guide marker or for recommending driving on a path different from the guide marker, for example, from the ROM 14*b* or the SSD 14*f*. When highlight display is performed by the highlight processing module 56, for example, when a region through which passage should be avoided is presented, the guide processing module 64 may display a mark indicating a region through which passage is easier than the presented region or a mark indicating the direction to the region (for example, arrow). Display of such a mark makes it easier to search for a travelable path.

The route calculating module 40 calculates a recommended route on which the vehicle 1 can travel more easily, using the roughness state of the road surface detected by the roughness state detecting module 32. The route calculating module 40 calculates a recommended route, for example, such that the number of times the vehicle 1 passes through a region that tilts the vehicle 1 by a predetermined angle or greater is minimized. The route calculating module 40 may calculate a recommended route with the best condition or may calculate a recommended route with the best condition as well as a plurality of recommended routes satisfying a comparable condition and let the user to select one of them. The route calculating module 40 may indicate the recommended route by one route line indicating the moving direction of the vehicle 1 or may indicate two path lines as the direction in which the right and left front wheels 3F move in the same manner as the path marker. When the recommended route calculated by the route calculating module 40 is displayed on the display device 8, the recommended route can be displayed in a display color different from the path marker, for example, in blue to improve the distinction between them. A virtual vehicle may be displayed such that it travels along the recommended route calculated by the route calculating module 40. That is, the recommended route may be simulated. When plural recommended routes are presented, drive simulations of the virtual vehicle on the recommended routes may be done so that a recommended route can be selected.

The output module 42 outputs the result of highlight of the guide marker by the highlight processing module 56, a display manner of the guide marker by the marker processing module 58, a display manner of the peripheral image by the peripheral image processing module 60, the result of superimpose of the guide marker by the superimpose module 62, and a message to call attention, operation procedure information, and the like by the guide processing module 64, to the display controller 14d. When the guide processing module 64 selects an audio message, message data is output to the audio controller 14e.

Specific display examples of guide markers based on the periphery monitoring apparatus (periphery monitoring system 100) configured as described above will be described with reference to FIG. 5 to FIG. 10. FIG. 5 to FIG. 10 illustrate the screen 8a appearing on the display device 8.

Figure 5:
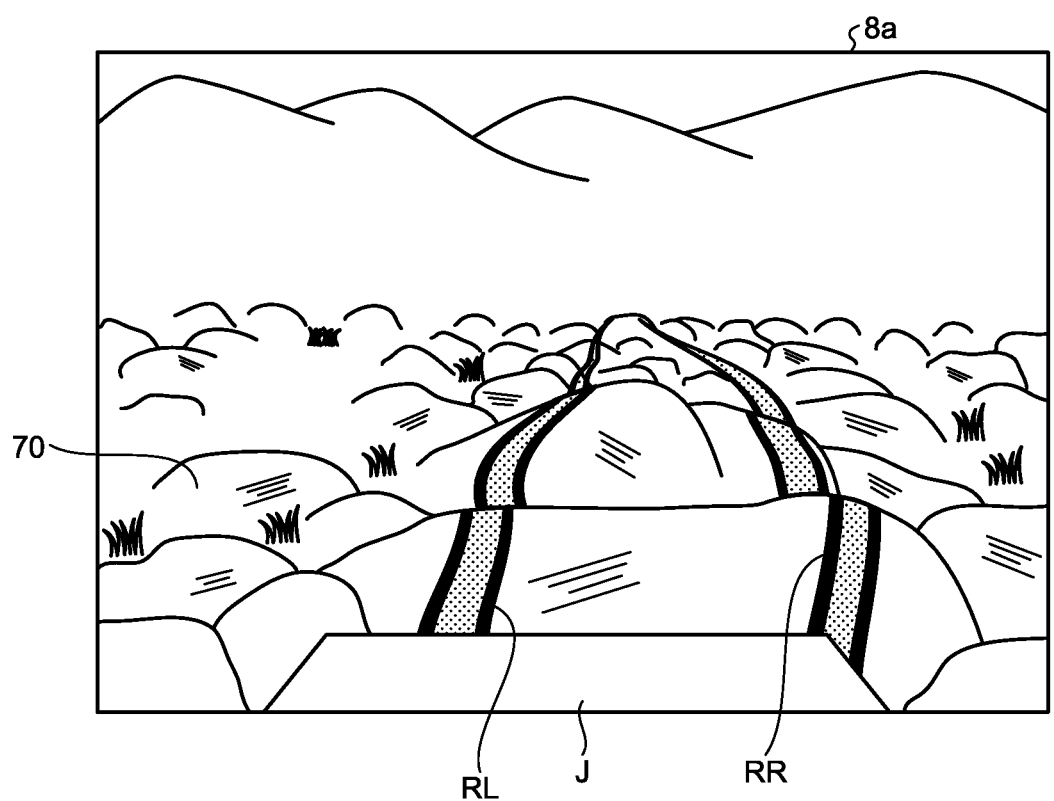
FIG. 5 is a diagram illustrating a display example for explaining a display manner in which a path marker is displayed as a guide marker in the periphery monitoring apparatus according to embodiments.

FIG. 5 is a display example of the screen 8a in which a path marker RL for the left front wheel 3F and a path marker RR for the right front wheel 3F are superimposed as guide markers ahead of the vehicle 1 when the vehicle 1 travels on a road surface 70 with many rocks. In the case of the screen 8a, the path markers RL and RR are displayed, for example, in red such that they can be easily distinguished from the road surface 70. The path marker acquiring module 50 can detect the color of the road surface 70 based on the captured image data acquired by the peripheral information acquiring module 30 and appropriately select a color such that the display color of the path markers RL and RL is not similar to the color of the road surface 70. In another embodiment, in order to further improve the visibility of the path markers RL and RR, the path markers RL and RR may be stereoscopically displayed. That is, the path markers RL and RR may be displayed as strip-shaped markers having a thickness. With stereoscopic display of the path markers RL and RR, the roughness state of the road surface 70 is more noticeable. A vehicle image J corresponding to part (front end) of the vehicle 1 is incorporated into the screen 8a, whereby the distance between the vehicle 1 and an object (for example, rock) in a region ahead can be grasped more easily, and grasping the relation between the vehicle 1 and the roughness of the road surface 70 is further facilitated.

In this way, the guide markers (path markers RL and RR) in a display manner that follows a roughness state of the road surface 70 are superimposed on the image in front of the vehicle 1, whereby the roughness state of the road surface 70 is more clearly defined by the shape of the guide markers and easily recognized by the user.

Figure 6:
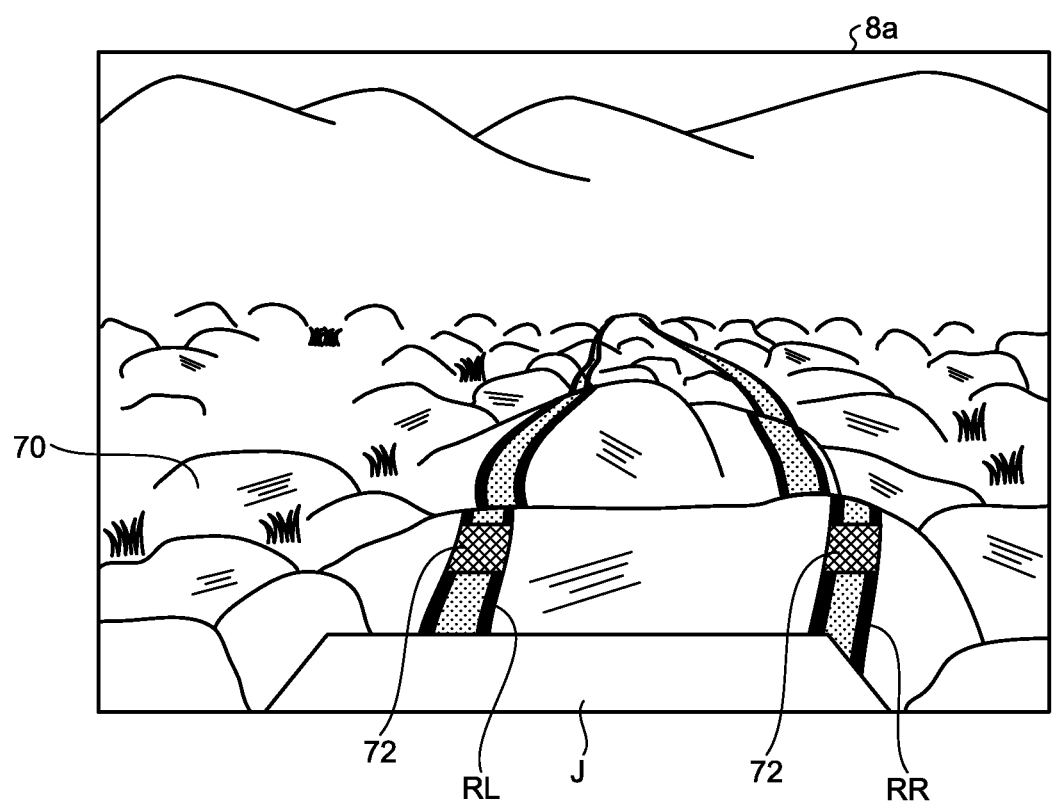
FIG. 6 is a diagram illustrating a display example for explaining a display manner in which a region indicating a roughness state equal to or greater than a predetermined threshold is highlighted when a path marker is displayed as a guide marker in the periphery monitoring apparatus according to embodiments.

FIG. 6 is a display example in which a section that requires special caution is highlighted in the path markers RL and RR superimposed in a display manner that follows the roughness state of the road surface 70 as in FIG. 5. When a region including a height or a gradient equal to or greater than a predetermined threshold relative to the position of the vehicle 1 is extracted based on the roughness state of the road surface 70 detected by the roughness state detecting module 32, and the path marker RL or the path marker RR overlaps the extracted region, the highlight processing module 56 performs a highlighting process on the extracted region. As the highlight display, for example, the region to be highlighted is displayed in a display color different from that of the path markers RL and RR, the region may be displayed in a blinking manner, the brightness of the region is changed, or the display transparency is changed. In FIG. 6, a region 72 is, for example, a protrusion having such a height that rubs the bottom surface of the vehicle 1. In this way, a region that requires special caution when the vehicle 1 moves along the path markers RL and RR is specified, so that the vehicle passing through the region can be deaccelerated to improve the safety, or other routes through which the vehicle can travel more easily by steering can be searched for. When highlight display is performed by the highlight processing module 56, the guide processing module 64 may output a message for calling attention. For example, a message such as "Bumps on path marker. Drive with caution." or "Bumps on path marker. Turn the steering wheel for other routes" may be displayed on the display device 8 or output from the audio output device 9.

Figure 7:
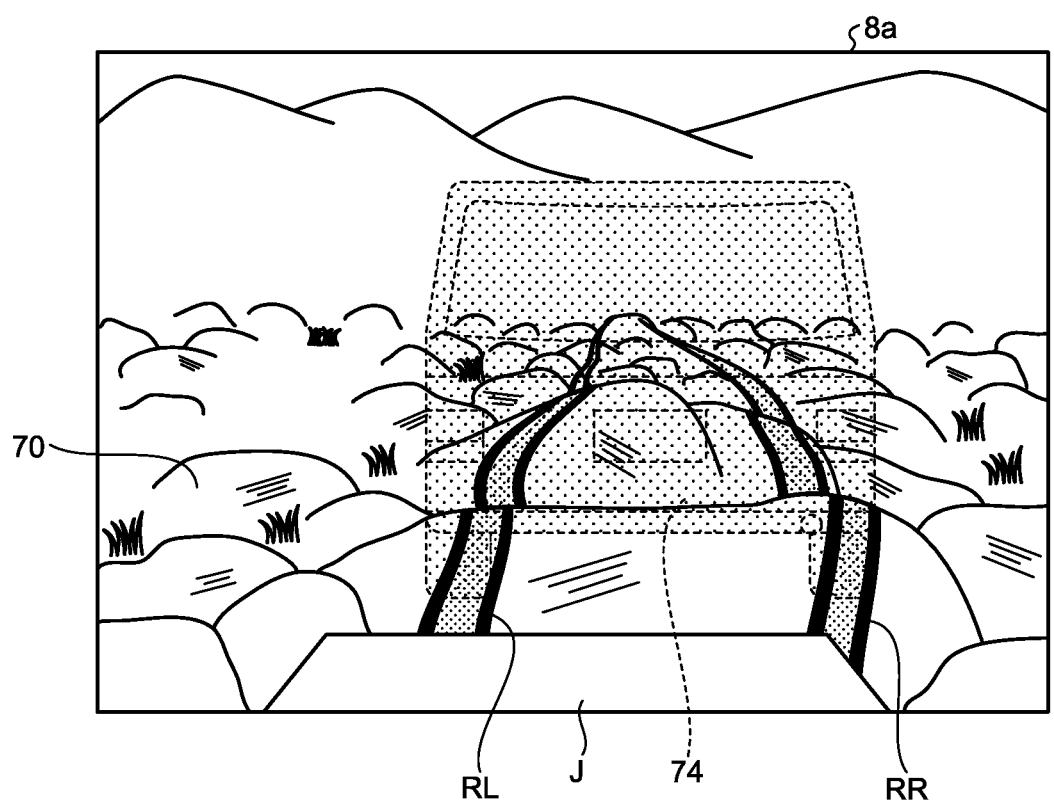
FIG. 7 is a diagram illustrating a display example for explaining a display manner in which a virtual vehicle is displayed as a guide marker in the periphery monitoring apparatus according to embodiments, in which the virtual vehicle is displayed immediately before the vehicle (vehicle itself).
Figure 8:
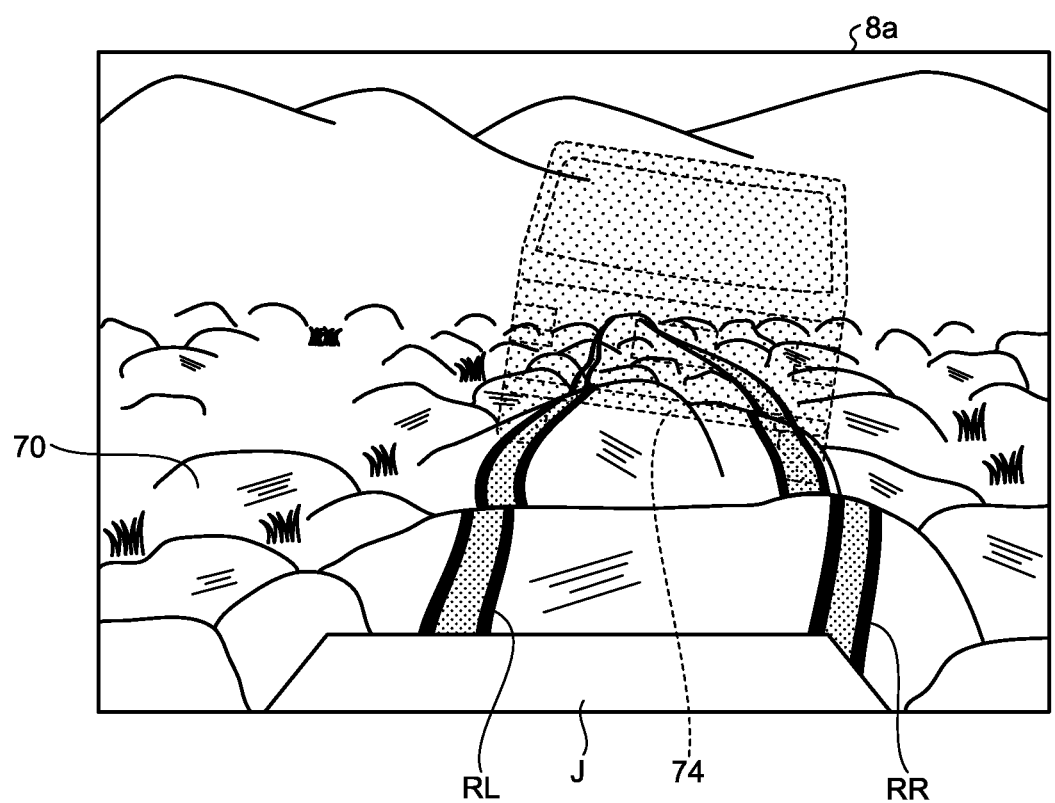
FIG. 8 is a diagram illustrating a display example for explaining a display manner in which a virtual vehicle is displayed as a guide marker in the periphery monitoring apparatus according to embodiments, in which the virtual vehicle is displayed such that it has moved to a position further away from the state in FIG. 7.
Figure 9:
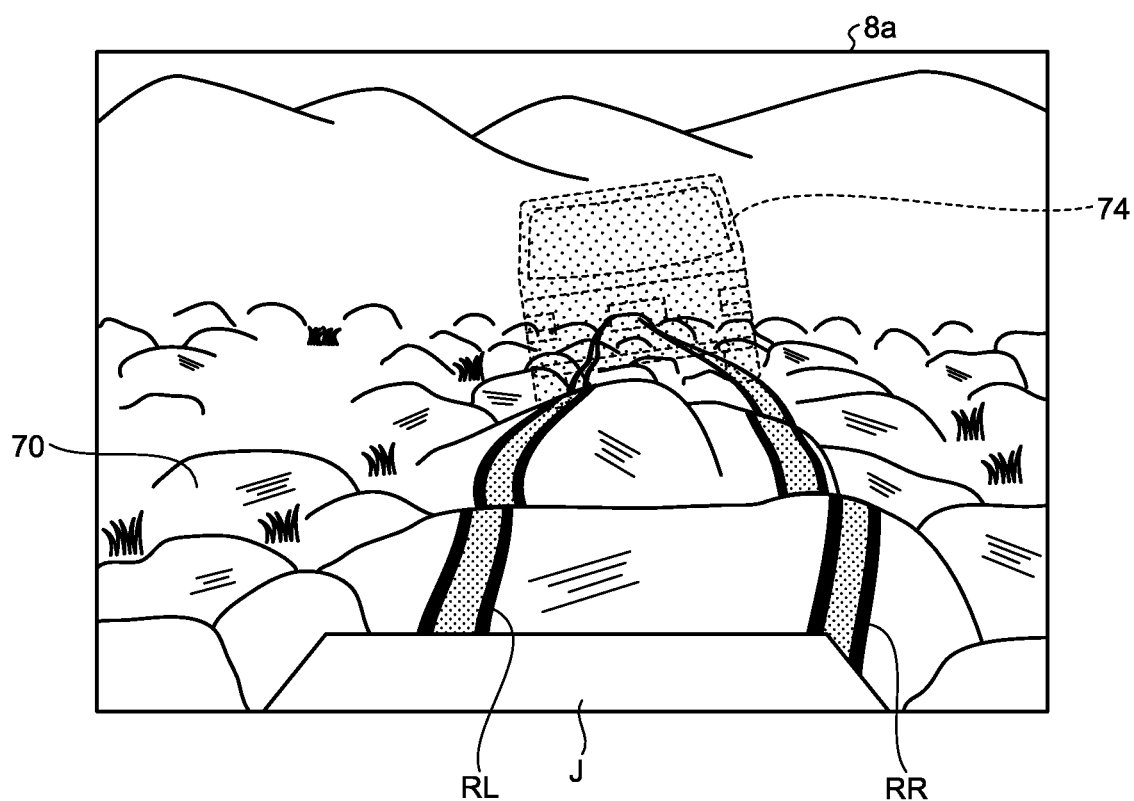
FIG. 9 is a diagram illustrating a display example for explaining a display manner in which a virtual vehicle is displayed as a guide marker in the periphery monitoring apparatus according to embodiments, in which the virtual vehicle has moved to a position further away from the state in FIG. 8.

FIG. 7 to FIG. 9 are display examples in which a virtual vehicle display mode is selected by the user to display a virtual vehicle ahead of the vehicle 1. When the ECU 14 receives a display request for a virtual vehicle 74 from the user through the operation input unit 10 or the operation unit 14g, the virtual vehicle acquiring module 52 selects display information indicating a virtual vehicle from the ROM 14b or the SSD 14f. The virtual vehicle 74 may be a vehicle having the same shape corresponding to the shape of the vehicle 1 or may be a vehicle having another shape. The shape of the virtual vehicle 74 corresponding to the shape of the vehicle 1 makes it easier to grasp the predicted moving state when the vehicle 1 moves to the position at which the virtual vehicle 74 is displayed. For example, the state when the vehicle 1 moves is easily grasped from the relative relation between the road surface 70 and the virtual vehicle 74 appearing on the screen 8a.

The virtual vehicle 74 is displayed, for example, translucently with an increased transparency so as not to hinder the visual recognition of the road surface 70 and the path markers RL and RR. When the vehicle image J indicating the present position of the vehicle 1 and the virtual vehicle 74 are displayed simultaneously, the transparency of the virtual vehicle 74 displayed at a position along the predicted path may be increased compared with the display state of the vehicle image J. Displaying the virtual vehicle 74 with an increased transparency in this manner gives a greater impression that the virtual vehicle 74 displayed at a distance from the vehicle image J is an image indicating the predicted moving state of the vehicle 1 and makes it easier to grasp the contents of the screen 8a. The virtual vehicle 74 displayed with an increased transparency is less likely to hinder display of the peripheral image appearing together with the virtual vehicle 74 on the screen 8a, thereby making it easier to grasp the peripheral image.

The virtual vehicle display mode of displaying the virtual vehicle 74 may provide fixed display such that, for example, the virtual vehicle 74 is fixed at a position preceding the vehicle 1 by a predetermined distance ahead. In this fixed mode, the relative distance between the vehicle 1 and the virtual vehicle 74 does not change. In the case of the fixed mode, the virtual vehicle 74 may be displayed at a position corresponding to a defined value, for example, three meters ahead of the vehicle 1 or at a display position selected by the user. In this case, the virtual vehicle 74 is displayed in a vehicle attitude corresponding to the roughness state of the road surface 70 at the display position. Therefore, when the vehicle 1 moves in accordance with the path markers RL and RR, the virtual vehicle 74 also moves similarly and the vehicle attitude also changes with the roughness state of the road surface 70 at a destination. In this way, the virtual vehicle 74 is displayed in the fixed mode, whereby the attitude of the vehicle 1 in the near future can be easily grasped as the vehicle 1 is moved slowly. For example, the user can easily imagine the attitude of the vehicle 1 three meters ahead and is likely to perform driving operation more accurately in accordance with the state of the road surface 70.

Another display mode is a traveling mode in which the virtual vehicle 74 is displayed so as to continuously or intermittently move away from the vehicle 1. The traveling mode is a mode in which the virtual vehicle 74 continuously moves ahead as illustrated in FIG. 7, FIG. 8, and FIG. 9 in a display manner such that it travels separating from the vehicle image J depicting the vehicle 1 displayed at the lower end of the screen 8*a*. That is, in this mode, the course through which the virtual vehicle 74 moves over a predetermined distance along the predicted path expected to be taken by the vehicle 1 is displayed on the display device 8. When the traveling mode is selected, the virtual vehicle 74 moves ahead, for example, for 10 seconds (or, for example, 30 meters) while changing the vehicle attitude in accordance with the roughness state of the road surface 70. In such a traveling mode, the virtual vehicle 74 is displayed so as to gradually move from the present position of the vehicle 1 to indicate the degree of the inclination and the degree of shaking of the moving vehicle 1 at each movement position when the vehicle 1 moves along the path markers RL and RR. As a result, a simulation can be performed to make it easier to intuitively grasp the predicted moving state of the vehicle 1. The virtual vehicle 74 in a display manner of separating from the vehicle image J is displayed with the vehicle image J indicating the present position of the vehicle 1. This gives an impression that the virtual vehicle 74 is a virtual vehicle that predictably indicates the moving state of the vehicle 1 in the future, relative to the position of the vehicle 1, and makes it easier to grasp the display contents of the screen 8*a*. When the virtual vehicle 74 is displayed in the traveling mode, it may be displayed continuously as described above or may be displayed intermittently at predetermined intervals as individually illustrated in FIG. 7, FIG. 8, and FIG. 9. When the virtual vehicle 74 is continuously displayed, the transition in attitude change of the virtual vehicle 74 can be displayed in more detail. On the other hand, when the virtual vehicle 74 is intermittently displayed, the processing load for displaying the virtual vehicle 74 can be reduced while the attitude change of the virtual vehicle 74 is displayed, although simpler than the continuous display.

In the traveling mode, when a region that requires attention is present on the path marker RL or on the path marker RR, the region may be highlighted (for example, red display, blinking display, high-brightness display) in the same manner as described in the example illustrated in FIG. 6. When it is determined that it is difficult to pass through the highlighted region, the marker processing module 58 may stop the virtual vehicle 74 at the determined position. For example, when the analysis of the captured image data (stereo image data) captured by the imager 15 or the detection result of the laser scanner 28 shows that the gradient of the road surface 70 exceeds a value at which the vehicle 1 can pass over or there is an obstacle that the vehicle 1 contacts with, the virtual vehicle 74 is stopped. The highlight processing module 56 may perform highlight display (for example, red display, blinking display, high-brightness display) of the virtual vehicle 74 to call attention in a state in which with the virtual vehicle 74 stops. As another example indicating that traveling is impossible, the virtual vehicle 74 may be displayed such that its attitude is excessively distorted to further call the user's attention. In this way, the virtual vehicle 74 is displayed in the traveling mode whereby the roughness state of the road surface 70 can be clearly displayed continuously from the present position of the vehicle 1 to a distant position. This display allows the user to determine whether to drive to follow the path markers RL and RR or whether to select another route, in an earlier stage. For example, the region where traveling is impossible can be avoided well in advance. Since the region where traveling is impossible can be avoided earlier, the path markers RL and RR can be rerouted at a stage when there are many choices of routes for avoiding the region. The moving distance of the virtual vehicle 74 in the traveling mode may be fixed or may be set as appropriate by the user, for example, in a region with good visibility.

In another embodiment, when the virtual vehicle 74 is displayed in the traveling mode, the marker control module 38 may perform control such that the virtual vehicle 74 moves over a predetermined distance along the predicted path and thereafter returns to the present position of the vehicle 1 (the position of the vehicle image J) and moves over a predetermined distance again along the predicted path. For example, the virtual vehicle 74 is displayed such that it moves away from the vehicle image J as illustrated in FIG. 7 to FIG. 9 and thereafter temporarily returns to the position of the vehicle image J and again moves away from the vehicle image J as illustrated in FIG. 7 to FIG. 9. This action may be repeated multiple times. In this way, the movement of the virtual vehicle 74 is repeated between the present position of the vehicle 1 (the position of the vehicle image J) and a position at a predetermined distance therefrom, whereby the behavior of the vehicle 1 (vehicle itself) moving from now on can be repeatedly presented to the user. This processing enables the user to more clearly grasp the traveling image in a case where the vehicle 1 (vehicle itself) travels on the selected path on which the virtual vehicle 74 has moved, thereby improving a feeling of safety during driving.

In another embodiment, the virtual vehicle 74 may be displayed only when the vehicle 1 is stopped. The virtual vehicle 74 may be displayed only when a display request by the user is received during vehicle stop. When the vehicle 1 starts moving in a state in which the virtual vehicle 74 is being displayed, the virtual vehicle 74 may be hidden for example, simultaneously with the start of moving or when a predetermined speed is exceeded. The virtual vehicle 74 is displayed during vehicle stop or only at a predetermined speed or less, whereby information provided during traveling of the vehicle 1 is limited, and the visibility of the image in the traveling direction of the vehicle 1 is further improved.

Figure 10:
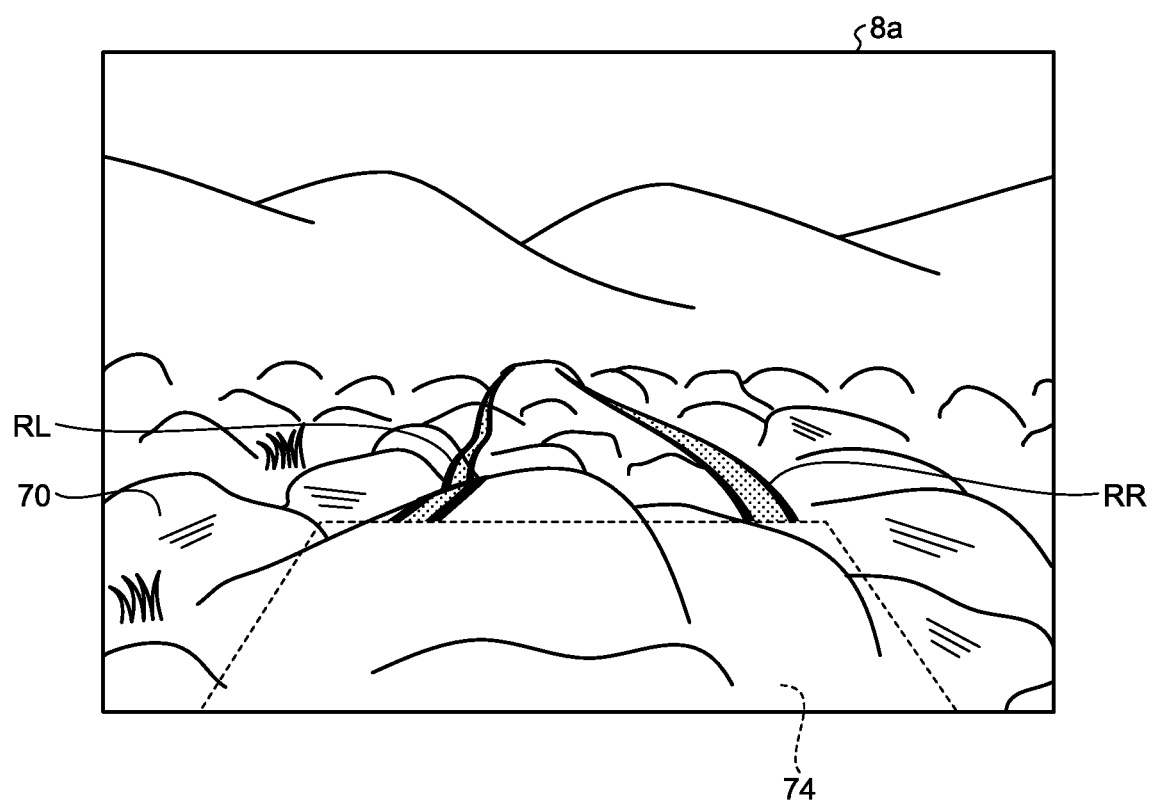
FIG. 10 is a diagram illustrating a display example for explaining a display manner of a peripheral image in which the virtual vehicle has moved to the position in FIG. 9 and the movement position is the point of view, in the periphery monitoring apparatus according to embodiments.

FIG. 10 is a display example illustrating a peripheral image viewed from, for example, the driver's seat when the virtual vehicle 74 moves to, for example, the position illustrated in FIG. 9. When the virtual vehicle 74 is displayed, for example, upon the user's display request for a preceding point of view image (future image) through the operation input unit 10 or the operation unit 14g, the peripheral image processing module 60 switches the screen 8a appearing on the display device 8 to the example illustrated in FIG. 10. In the display example in FIG. 10, the front end of the virtual vehicle 74 is displayed translucently at the lower end side of the screen 8a, and the peripheral image viewed from the position corresponding to the driver's seat of the virtual vehicle 74 is displayed. The virtual vehicle 74 displayed translucently makes it easier for the user to understand that a preceding point of view image (future image) is being displayed on the display device 8. As previously mentioned, the image displayed on the screen 8a here can be an enlarged image based on the captured image data acquired by the imager 15c at the present position of the vehicle 1, for example, in accordance with the distance from the vehicle 1 to the virtual vehicle 74. Because of the image enlarged, the landscape that looks small and far away at the position of the vehicle 1 is displayed in a large view, and the landscape displayed looks as if it is viewed at the position of the virtual vehicle 74 that has moved far away. The path markers RL and RR also may be displayed so as to extend far away from the position of the virtual vehicle 74 that has moved far away. As a result, the user can easily recognize the roughness state of the road surface 70 further ahead after moving to the position of the virtual vehicle 74. The process of enlarging the image may involve degradation of the image quality. In such a case, well-known image correction techniques may be used to correct the image as appropriate. The preceding point of view image (future image) can be displayed wherever the virtual vehicle 74 is present. For example, the preceding point of view image (future image) may be displayed in response to a display request when the virtual vehicle 74 is displayed in the fixed mode. When a display request is made when the virtual vehicle 74 is displayed in the traveling mode, the display may be switched to the state illustrated in FIG. 10, and the point of view may be further moved ahead (enlargement display is continuously performed) with the preceding point of view image (future image) kept displayed. That is, an image may be displayed as if the user views the periphery while driving at the preceding position.

Figure 11:
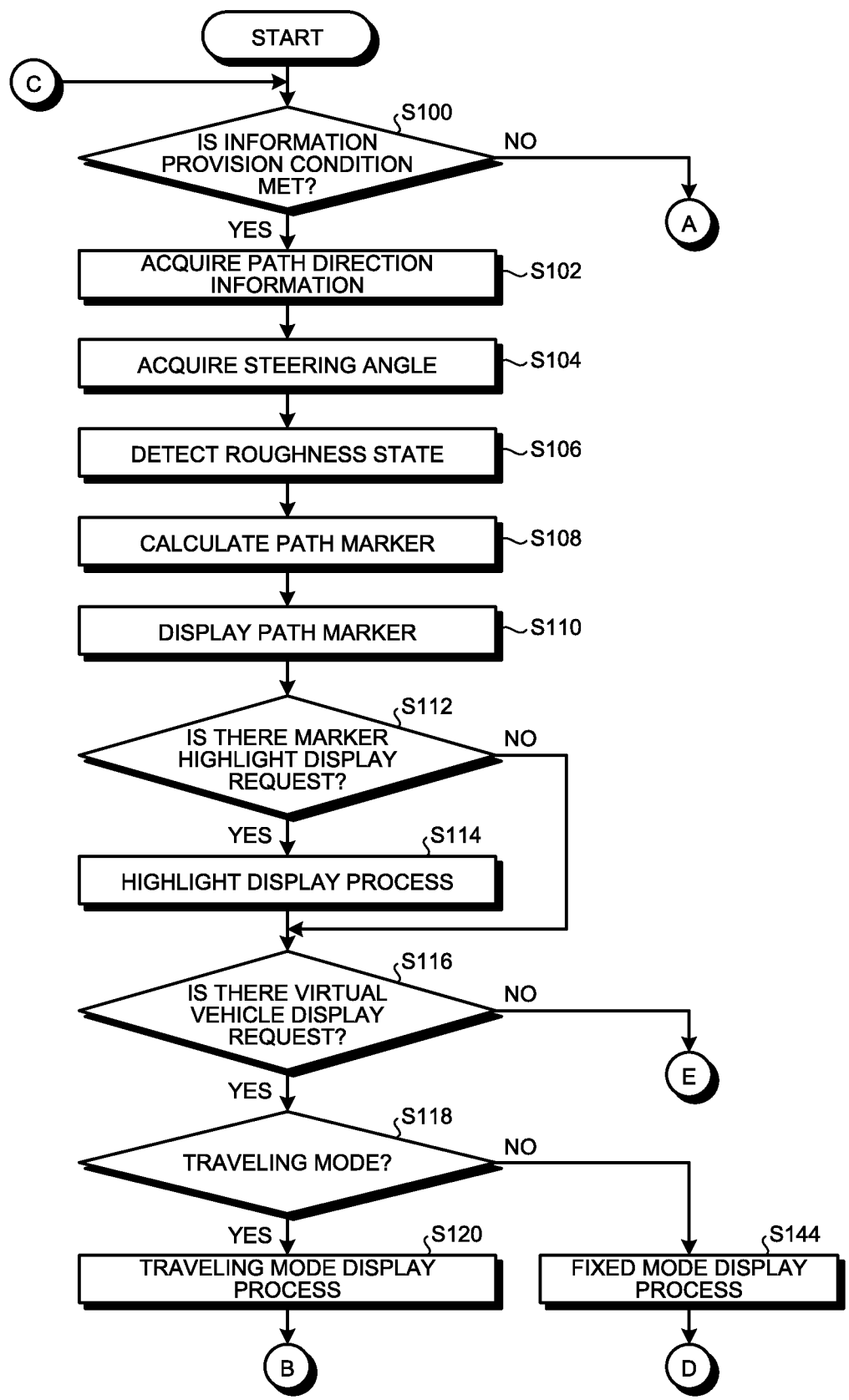
FIG. 11 is a flowchart illustrating the first half of the procedure when a guide marker is displayed in the periphery monitoring apparatus according to embodiments.
Figure 12:
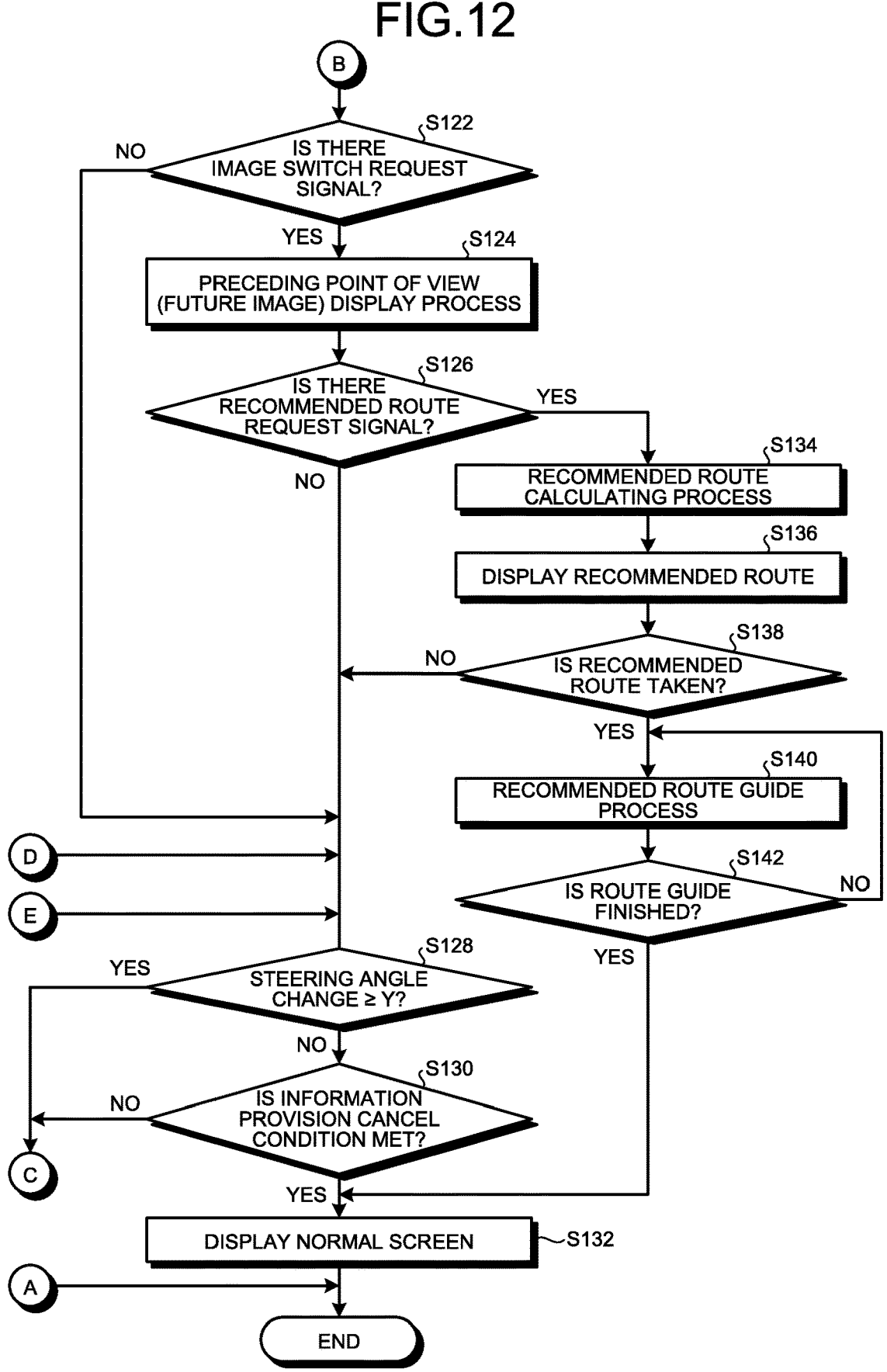
FIG. 12 is a flowchart illustrating the second half of the procedure when a guide marker is displayed in the periphery monitoring apparatus according to embodiments.

An example of the process of displaying a guide marker as described above is described using the flowcharts in FIG. 11 and FIG. 12. FIG. 11 is a flowchart illustrating the first half of the process, and FIG. 12 is a flowchart illustrating the second half of the process.

First of all, the ECU 14 detects the presence/absence of a signal indicating that a condition for permitting information provision as to a guide marker (path markers RL and RR and virtual vehicle 74) (S100). For example, if a navigation screen display mode or an audio screen display mode is selected as a display mode of the display device 8, or if the speed of the vehicle 1 is equal to or greater than a predetermined speed (for example, 20 km/h or more), it is determined that there is no display request for a guide marker or that the traveling state is not desirable for display of a guide marker, and the ECU 14 terminates this flow (No at S100). The information provision condition can be changed as appropriate, for example, by the user.

If the information provision condition is satisfied (Yes at S100), for example, if the user operates the operation input unit 10 or the operation unit 14g to request display of a guide marker, and if the vehicle speed of the vehicle 1 is lower than a predetermined speed, the peripheral information acquiring module 30 acquires information of the path direction of the vehicle 1 (S102). For example, if the transmission operating unit 7 is in a position other than "reverse", the peripheral information acquiring module 30 acquires the captured image data by the imager 15c with a captured region in the peripheral region ahead of the vehicle 1. If the imager 15c is a stereo camera, three-dimensional information of the captured range is also acquired at the same time. When the imager 15c is a monocular camera, the peripheral information acquiring module 30 acquires captured image data with a captured range in the peripheral region ahead of the vehicle 1 from the imager 15c and acquires three-dimensional information ahead of the vehicle 1 from the laser scanner 28. The steering angle acquiring module 34 also acquires the steering angle of the vehicle 1 at present from the detection result of the steering angle sensor 19 (S104).

Subsequently, the roughness state detecting module 32 detects a roughness state of the road surface 70 based on the three-dimensional information acquired by the imager 15c (stereo camera) or the laser scanner 28 (S106). The CPU 14a then calculates path markers RL and RR in a display manner that follows the roughness state of the road surface 70 (S108). Specifically, the path marker acquiring module 50 acquires a path marker having a flat reference shape extending in the direction in which the front wheels 3F are oriented, based on the steering angle acquired by the steering angle acquiring module 34. The marker processing module 58 then changes the shape of the acquired path marker having a reference shape, based on the three-dimensional information indicating the roughness state of the road surface 70 detected by the roughness state detecting module 32, into path markers RL and RR that follow the roughness state. The marker processing module 58 then superimposes the calculated path markers RL and RR at the corresponding positions in the image captured by the imager 15c and displays the image on the display device 8 (S110).

The highlight processing module 56 also detects the presence/absence of a signal indicating a request for highlight to display a region that requires caution, for the path markers RL and RR displayed on the display device 8 (S112). If there is a highlight request for the path markers RL and RR (Yes at S112), the highlight processing module 56 specifies a section with the magnitude of roughness exceeding a predetermined value or a section where there is an obstacle that may interfere with the vehicle 1, in accordance with the roughness state of the road surface 70 detected by the roughness state detecting module 32, and performs highlight display as illustrated in FIG. 6 for the corresponding regions 72 on the path markers RL and RR (S114). If a request signal for highlight display fails to be detected (No at S112), the highlight processing module 56 skips the process at S114. If highlight display is automatically performed, the highlight processing module 56 may perform the highlight display process when the path markers RL and RR are calculated at S108.

Subsequently, the virtual vehicle acquiring module 52 detects the presence/absence of a signal indicating a display request for the virtual vehicle 74 (S116). If there is a display request for the virtual vehicle 74 (Yes at S116) and the traveling mode is requested (Yes at S118), the virtual vehicle acquiring module 52 acquires display data of the virtual vehicle 74 from the ECU 14 or the SSD 14f, for example, to provide the display as illustrated in FIG. 7 to FIG. 9. The marker processing module 58 and the superimpose module 62 then perform the process of displaying the virtual vehicle 74 in a display manner that it moves away ahead of the vehicle 1 (S120).

The peripheral image processing module 60 detects whether a display request (image switch request) signal for a preceding point of view image (future image) is input during execution of the traveling mode, or when the virtual vehicle 74 is displayed so as to stop at a predetermined position at a far distance, or when the virtual vehicle 74 is being displayed in the fixed mode (S122). If an image switch request signal is detected (Yes at S122), the peripheral image processing module 60 generates a preceding point of view image (future image) viewed from the point of view corresponding to the movement position of the virtual vehicle 74 as illustrated in FIG. 10 and displays the generated image on the display device 8 through the output module 42 (S124).

The route calculating module 40 detects whether a request signal for calculating (displaying) a recommended route is input while the guide markers (path markers RL and RR and the virtual vehicle 74) appear on the display device 8 (S126). If a request signal for calculating (displaying) a recommended route is not detected (No at S126), the CPU 14a detects whether the steering angle acquired by the steering angle acquiring module 34 is changed by a predetermined angle Y or more in a predetermined period after the guide markers appear on the display device 8, for example, for 20 seconds (S128). If the steering angle is changed by a predetermined angle, for example, if the steering angle is changed by 10° or more (Yes at S128), the CPU 14a determines that the user requests display of a guide marker oriented in a direction different from the guide markers (the path markers RL and RR, the virtual vehicle 74) displayed at present, and proceeds to S100 to perform the process of displaying (updating) a guide marker again.

On the other hand, if the steering angle acquired by the steering angle acquiring module 34 is not changed by a predetermined angle Y or more in a predetermined period, for example, for 20 seconds (No at S128), the CPU 14a detects the presence/absence of a signal indicating that an information provision cancel condition is met (S130). For example, if a navigation screen display mode or an audio screen display mode is selected as a display mode of the display device 8, or if the speed of the vehicle 1 is equal to or greater than a predetermined speed (for example, 20 km/h or more), it is determined that a display request for guide markers is cancelled or that the traveling state shifts to a state undesirable for display of guide markers, and the information provision cancel condition is met (Yes at S130). The ECU 14 then displays a navigation screen or an audio screen requested to be displayed on the display device 8 or a normal screen that does not bother during driving (S132) and temporarily terminates this flow.

At S130, if it is determined that the information provision cancel condition is not met (No at S130), the CPU 14a determines that the user requests that display of the guide markers should be continued, and proceeds to S100 to perform the process of displaying (updating) a guide marker.

Figure 13:
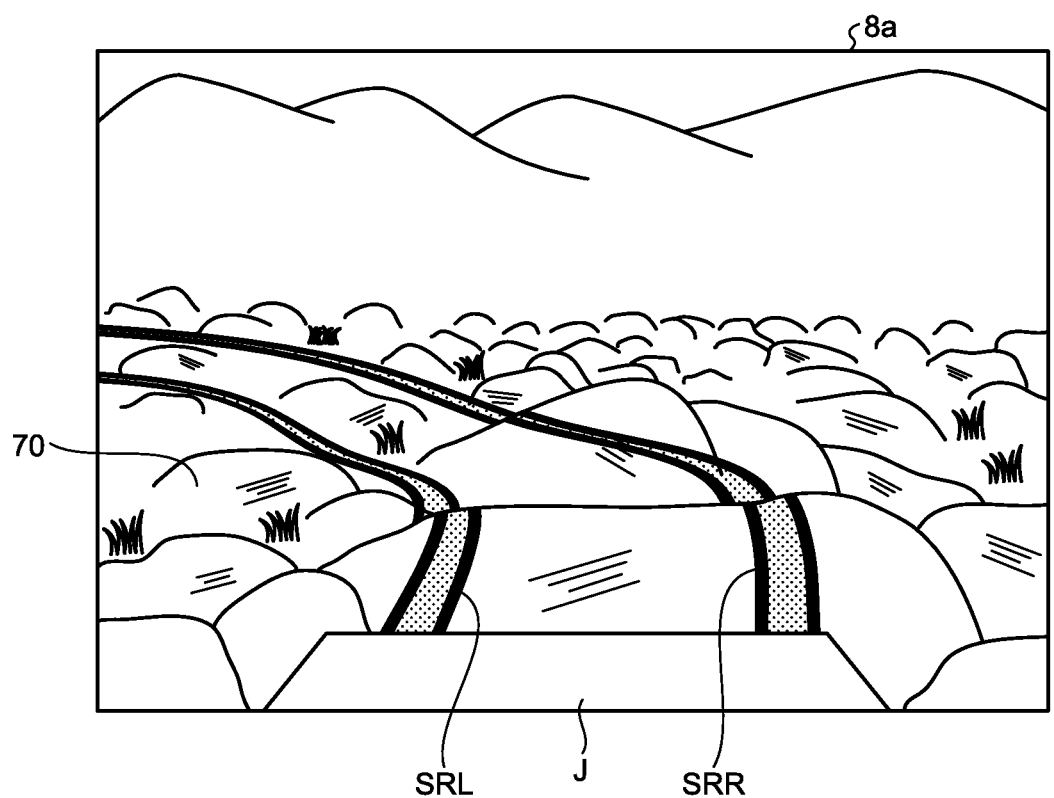
FIG. 13 is a diagram illustrating a display example for explaining a display manner in which a path marker on which driving is recommended is depicted as a guide marker in the periphery monitoring apparatus according to embodiments.

At S126, if a request signal for calculating (displaying) a recommended route input through the operation input unit 10 or the operation unit 14g is detected (Yes at S126), the route calculating module 40 refers to the roughness state of the road surface 70 detected by the roughness state detecting module 32 to calculate a recommended route (S134) and displays the recommended route on the display device 8 through the output module 42 (S136). The recommended route is an example of guide markers and can be calculated, for example, such that the number of times the vehicle 1 passes through a region that tilts the vehicle 1 by a predetermined angle or greater is minimized. In this case, the route calculating module 40 may calculate only one recommended route with the best condition or may calculate a recommended route with the best condition as well as a plurality of recommended routes that satisfy the comparable condition so that the user selects one of them. If a recommended route is calculated, the marker processing module 58 deforms the recommended route to attain a display manner that it follows the roughness state of the road surface 70 detected by the roughness state detecting module 32, in the same manner as for the path markers RL and RR. FIG. 13 is a display example of the recommended routes SRL and SRR. When the recommended routes SRL and SRR are displayed, the vehicle image J representing part (front end) of the vehicle 1 is also incorporated into the screen 8a, whereby the distance between the vehicle 1 and an object (for example, rock) in the region ahead can be grasped more easily, and the relation between the vehicle 1 and the roughness of the road surface 70 and the direction of the recommended routes SRL and SRR can be grasped more easily. Although FIG. 13 illustrates an example in which only the recommended routes SRL and SRR are displayed, the path marker RL and the path marker RR may be displayed together. When only the recommended routes SRL and SRR are displayed, the degree of recognition and the degree of attention to the recommended routes SRL and SRR can be increased. On the other hand, when the path markers RL and RR and the recommended routes SRL and SRR are displayed at the same time, the path markers RL and RR are easily compared with the recommended routes SRL and SRR, so that the user can more easily determine whether to choose the recommended routes SRL and SRR. When the path markers RL and RR and the recommended routes SRL and SRR are displayed at the same time, it is preferable that they may be displayed in different display manners in order to increase the distinction therebetween. For example, the path markers RL and RR are displayed in red, and the recommended routes SRL and SRR are displayed in blue. Alternatively, the path markers RL and RR may be made less noticeable by increasing the display transparency while the recommended routes SRL and SRR may be made noticeable by reducing the display transparency, so that they are easily distinguished from each other.

If the CPU 14a acquires a signal indicating that the presented recommended routes SRL and SRR are to be taken, through the operation input unit 10 or the operation unit 14g (Yes at S138), the guide processing module 64 performs the route guide process using the selected recommended routes SRL and SRR (S140). For example, the operation guide of the steering unit 4 is provided. If the path markers RL and RR are displayed at the start of guiding to the recommended routes SRL and SRR, the path markers RL and RR are preferably hidden. If the route guide based on the recommended routes SRL and SRR is finished (Yes at S142), the ECU 14 proceeds to the process at S132 and temporarily terminates the flow. If the route guide is not finished (No at S142), the process returns to S140 to continue the recommended route guide process. At S138, if the presented recommended routes SRL and SRR are not taken by the user (No at S138), the process proceeds to S128 to continue the subsequent process. At S122, if an image switch request signal is not detected (No at S122), the process proceeds to S128 to continue the subsequent process.

At S118, if the traveling mode is not selected as a display mode of the virtual vehicle 74 (No at S118), the display process in the fixed mode is performed (S144). In this case, the marker processing module 58 and the superimpose module 62 display the virtual vehicle 74 fixed at a position corresponding to a predetermined distance ahead of the vehicle 1 (for example, three meters ahead). The process then proceeds to S128 to perform the subsequent process.

At S116, if the marker acquiring module 36 fails to acquire a signal indicating a display request for the virtual vehicle 74 from the user through the operation input unit 10 or the operation unit 14g (No at S116), the process proceeds to S128 to perform the subsequent process.

In this way, the periphery monitoring system 100 in the present embodiment displays a guide marker in a display manner that follows the roughness state of the road surface 70 on the display device 8 to make it easier to grasp the state of the road surface 70 on which the vehicle 1 will travel, allow the user to easily select the route easy to drive, and provide efficient driving. The periphery monitoring system 100 in the present embodiment can provide a driving mode in which a steep route (rough road) is intentionally selected so that the user enjoys driving on an uneven road (off-road). Also in such a case, a route can be selected as appropriate according to the roughness state of the road surface 70, thereby improving the enjoyment of off-road driving. In this case, a rough road simulation may be performed by displaying the virtual vehicle 74 moving along the selected route (rough road). In this case, a failure simulation may be provided depending on the roughness state of the road surface 70, for example, such that the virtual vehicle 74 falls over.

Figure 14:
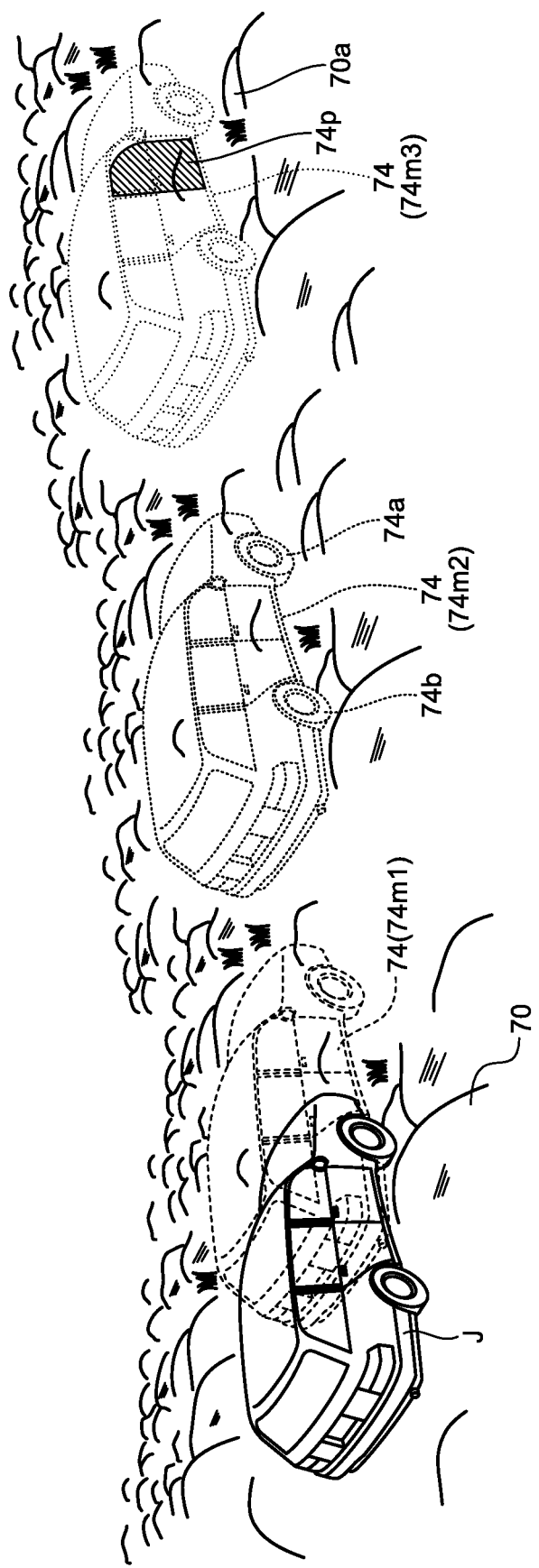
FIG. 14 is a diagram illustrating a display example for explaining another display manner in which a virtual vehicle is displayed as a guide marker in the periphery monitoring apparatus, in which the vehicle image and the virtual vehicle are displayed in an overhead view.

FIG. 14 is a diagram illustrating another display example in the traveling mode of the virtual vehicle 74. In the case of FIG. 14, the vehicle image J and the virtual vehicle 74 are displayed in an overhead image (3D image), and the virtual vehicle 74 is displayed so as to separate from the vehicle image J. In the display in an overhead image, data of the vehicle image J can be acquired from the ROM 14b or the SSD 14f. Then, when the virtual vehicle 74 is displayed in the traveling mode, the virtual vehicle 74 may have the transparency gradually increased as illustrated by virtual vehicle 74m1, virtual vehicle 74m2, and virtual vehicle 74m3, as it goes away from the vehicle image J. Finally, the virtual vehicle 74 may disappear with a transparency of 100%. Changing the transparency in this manner makes it easy to distinguish between the vehicle image J and the virtual vehicle 74 and facilitates recognition that the moving vehicle (virtual vehicle 74) is a virtual vehicle and its moving state is displayed. The vehicle image J and the virtual vehicle 74 may be identified easily by different display colors. For example, the vehicle image J may be, for example, blue corresponding to the body color of the vehicle 1 and the virtual vehicle 74 may be pale blue. The virtual vehicle 74 may of a color different from the vehicle image J and may be selected by the user. The virtual vehicle 74 moving far away may be represented by successively changing its display color with movement (for example, changed so as to be gradually pale). The virtual vehicle 74 may be represented diagrammatically only by outline (vehicle frame) to facilitate recognition that it is a virtual vehicle. In addition, the diagrammatic representation makes it easier for the user to recognize the road surface state and the presence/absence of an obstacle without hiding the region around the virtual vehicle 74.

In FIG. 14, the virtual vehicle 74m1, the virtual vehicle 74m2, and the virtual vehicle 74m3 are illustrated for the sake of explanation. However, in the traveling mode, only one virtual vehicle 74 is displayed continuously or intermittently. In the fixed mode, the virtual vehicle 74m1, the virtual vehicle 74m2, and the virtual vehicle 74m3 illustrated in the figure are displayed at the corresponding positions with the transparency corresponding to the distance from the vehicle image J. In this case, one or more virtual vehicles 74 may be displayed so as to be fixed. When the virtual vehicle 74 is displayed in the traveling mode, the marker processing module 58 may display animation such that a front wheels 74a and a rear wheels 74b of the virtual vehicle 74 turn to facilitate recognition that the virtual vehicle 74 is displayed so as to travel. In the fixed mode, the front wheels 74a and the rear wheels 74b of the virtual vehicle 74 do not turn, so that the traveling mode and the fixed mode can be identified also in this respect.

When a region to call the user's attention is present on the moving route of the virtual vehicle 74 and, for example, the magnitude of roughness of the road surface 70 exceeds a predetermined value and requires special caution for passage, the highlight processing module 56 performs highlight display (for example, red display, blinking display, high-brightness display), for example, on the virtual vehicle 74m2 corresponding to the position. Such highlight display makes it easier for the user to objectively recognize the position that requires caution for passage and contributes to reducing the burden of driving the vehicle 1. The highlighted virtual vehicle 74 may be stopped at the position. In this case, the easiness of recognition of the position requiring attention can be improved. In another example, at the highlighted position, the virtual vehicle 74 may be divided into two, one of which may be displayed so as to stop and the other may keep moving. Such display can improve the easiness of recognition of the position requiring attention and makes it easier for the user to determine whether to select a path because the oncoming situation can be continuously observed. The virtual vehicle 74 displayed at the region that requires caution is highlighted to be easily distinguished from the vehicle image J.

FIG. 14 illustrates an example in which a big rock 70a exists near the side door at a display position of the virtual vehicle 74m3. That is, if the vehicle 1 stops at the position of the virtual vehicle 74m3, it is difficult to open the door. For example, when an obstacle that makes it difficult to open the door is detected based on the analysis of the captured image data (stereo image data) captured by the imager 15 or the detection result of the laser scanner 28, the highlight processing module 56 may highlight a door 74p difficult to open, as illustrated in FIG. 14. The highlight processing module 56 performs, for example, red display, blinking display, or high-brightness display. If the virtual vehicle 74 contacts with, for example, the rock 70a, the virtual vehicle 74m3 may be stopped at the position (the position immediately before the contact), and the entire virtual vehicle 74m3 may be highlighted. Such display makes it easier for the driver to take measures such as changing the moving direction in advance. Such a notification given when opening door would be difficult or a notification given when there is a possibility of contact may be used, for example, when the vehicle 1 is backed into a parking space to assist in parking the vehicle 1 well. The marker processing module 58 may display the virtual vehicle 74 with the vehicle-side door or the rear hatch door 2h open. In this case, the user can be notified in advance whether the opened door does not contact with an obstacle (for example, wall or other vehicles) in the periphery and ample space can be secured, so that the user can examine a good stop position of the vehicle 1 in advance.

The marker processing module 58 can stop the virtual vehicle 74 at any given position also when an overhead view as illustrated in FIG. 14 is displayed (as in FIG. 14, when an overhead view is displayed in a three-dimensional overhead image of the vehicle viewed diagonally backward from above). For example, the stop process can be performed when the user wishes to stop the virtual vehicle 74 using the operation input unit 10 or the operation unit 14g. Such display is enabled to allow the user to closely observe the inclination of the virtual vehicle 74 at the position or a state of driving onto a rock, so that the user can easily examine a path to choose in advance. In the fixed mode, the marker processing module 58 can move the virtual vehicle 74 by the amount of movement specified through the operation input unit 10 or the operation unit 14g. For example, the virtual vehicle 74 can be moved by 0.1 meter or by 0.5 meter depending on the manner of operating the operation input unit 10 or the operation unit 14g, and the attitude of the virtual vehicle 74 at each movement position can be closely observed, so that the user can easily examine, for example, a path to choose in advance. Even when a three-dimensional overhead image of the vehicle viewed diagonally backward from above as in FIG. 14 is displayed, the virtual vehicle 74 may be displayed in a vehicle attitude that follows a state (for example, roughness or gradient) of the road surface 70 as illustrated in FIG. 7 to FIG. 9. For example, in the traveling mode, the marker processing module 58 displays the virtual vehicle 74 such that it travels changing the vehicle attitude (shaking) in accordance with the shape of the road surface 70. In the fixed mode, the marker processing module 58 displays the vehicle attitude that follows the shape of the road surface 70 on which the virtual vehicle 74 is displayed so as to be fixed.

In FIG. 14, when the vehicle image J and the virtual vehicle 74 are displayed, information indicating the state of the vehicle may be displayed together. For example, the state of air pressure in each tire of the vehicle 1 may be displayed for the vehicle image J or the virtual vehicle 74. Specifically, the tire of the vehicle image J or the virtual vehicle 74 corresponding to the tire with an air pressure equal to or smaller than a predetermined value may be displayed in a predetermined display color (for example, yellow) to notify the driver that the air pressure is equal to or smaller than a predetermined value. In this case, it is preferable that the display color is a notification color (for example, yellow) different from a display color (warning color), for example, red, in a case where the virtual vehicle 74 contacts with an object (for example, rock 70a), so that the notification content is easily identified. The tire of the vehicle image J or the virtual vehicle 74 may be displayed in a shape assumed when the air pressure is reduced. The tire shape representing reduction of air pressure and the notification color may be displayed at the same time. In this way, the vehicle state (for example, tire air pressure reduction state) is displayed using the vehicle image J or the virtual vehicle 74, whereby the user (driver) can be easily notified of the change in vehicle state. For example, the wear state of the brake pad or the state of the light bulb may be displayed as the vehicle state.

FIG. 14 illustrates an example in which the vehicle image J indicating the position of the vehicle 1 (vehicle itself) is displayed, and the virtual vehicle 74 is displayed in such a display manner that it travels separating from the vehicle image J. In another embodiment, when display of the virtual vehicle 74 is started after the vehicle image J indicating the position of the vehicle 1 (vehicle itself) is displayed, the vehicle image J may be replaced by the virtual vehicle 74 and the virtual vehicle 74 may be displayed so as to move in the direction in which the vehicle 1 is expected to move. In another embodiment, after the vehicle image J indicating the position of the vehicle 1 (vehicle itself) is displayed, the vehicle image J may be hidden simultaneously when display of the virtual vehicle 74 is started or slightly later than the start of movement of the virtual vehicle 74, and only the virtual vehicle 74 may be displayed so as to move. In this way, when the virtual vehicle 74 is displayed, the vehicle image J is hidden to prevent appearance of a plurality of vehicle images on the screen 8a, thereby making it easier to recognize the display contents of the screen 8a. That is, when the vehicle image J and the virtual vehicle 74 are simultaneously displayed as in FIG. 14, the relation between the vehicle 1 and the virtual vehicle 74 can be easily grasped. On the other hand, in the case of simple display in which only the virtual vehicle 74 is displayed as in a display manner in another embodiment, the display attracts attention to the behavior or the attitude at the movement position of the virtual vehicle 74, the relation to the periphery, and the like. These display manners can be switched through selection by the user operating the operation input unit 10 or the like or may be set as a default mode.

Figure 15:
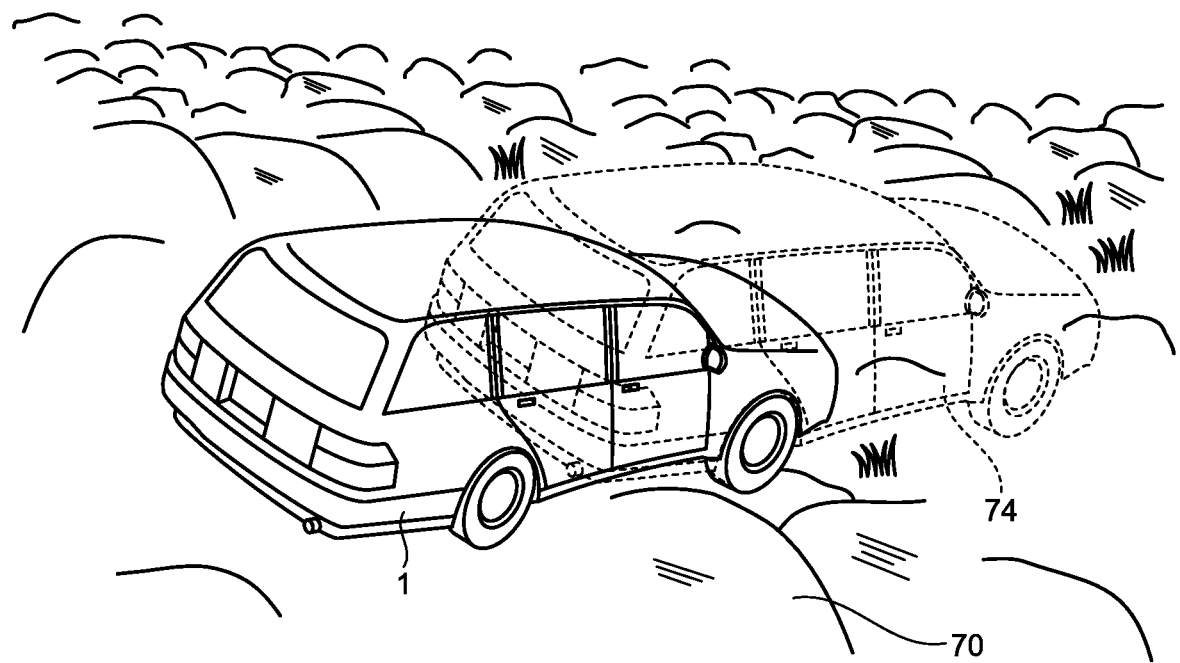
FIG. 15 is a diagram illustrating a manner in which the position corresponding to the front wheels of the vehicle substantially agrees with the position corresponding to the rear wheels of the virtual vehicle when the virtual vehicle is displayed as a guide marker, in the periphery monitoring apparatus according to embodiments.
Figure 16:
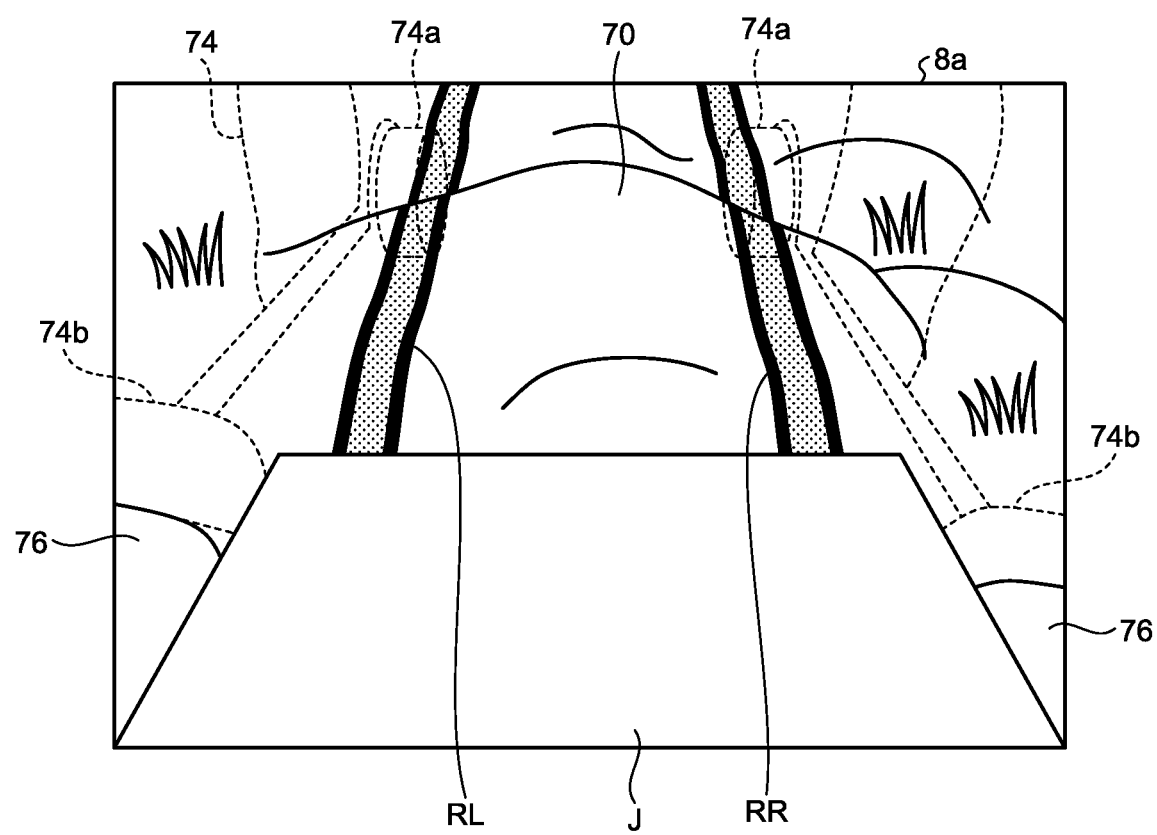
FIG. 16 is a diagram illustrating a display example of a display device in a case where the virtual vehicle exists at the position illustrated in FIG. 15, in the periphery monitoring apparatus according to embodiments.
Figure 17:
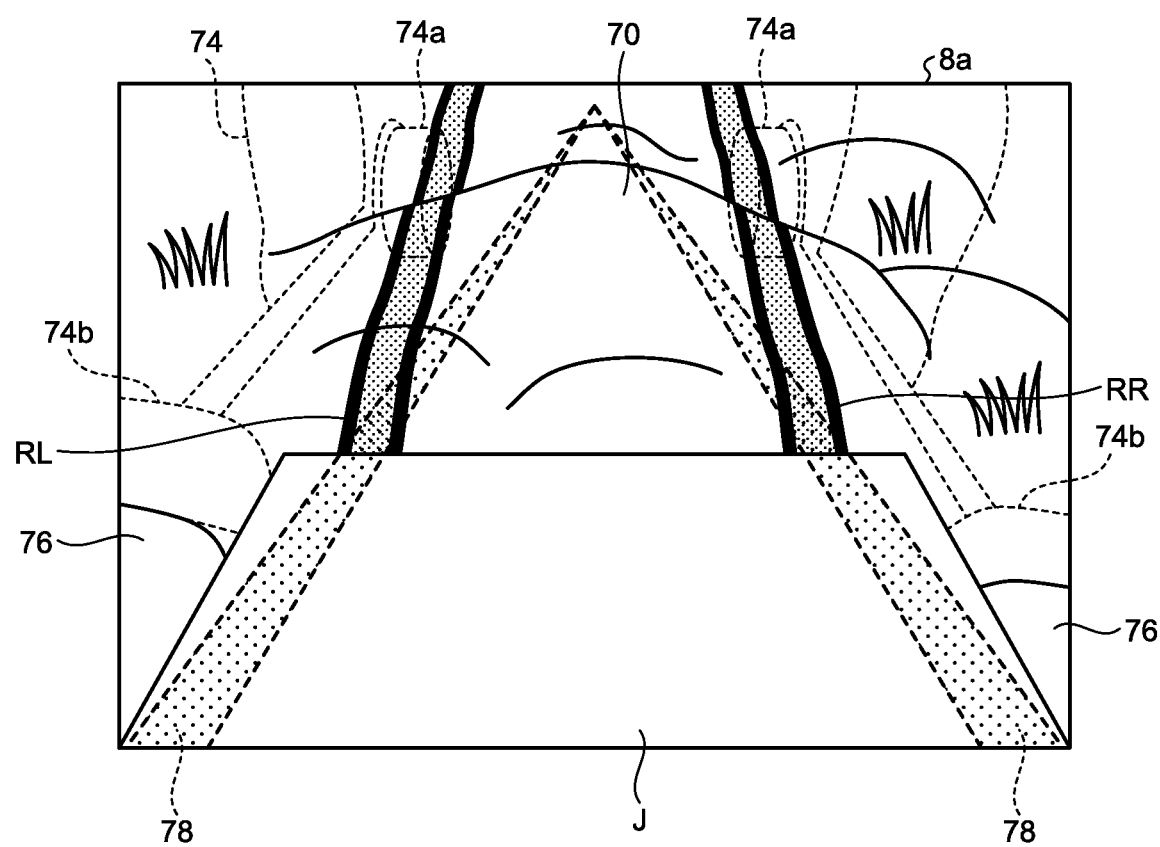
FIG. 17 is a diagram illustrating a display example in which a virtual vehicle (guide marker) and a reference marker are displayed on the same screen when the virtual vehicle exists at a position illustrated in FIG. 15, in the periphery monitoring apparatus according to embodiments.

FIG. 15 to FIG. 17 are diagrams illustrating another embodiment in a case where the virtual vehicle 74 is displayed in the fixed mode. The virtual vehicle 74 in the display example in FIG. 7 to FIG. 9 is depicted in such a display manner that it travels at a distance ahead of the vehicle 1, in which the rear view of the virtual vehicle 74 is mainly depicted. When the vehicle attitude of the virtual vehicle 74 in such a display manner is reproduced, as an example, the vehicle attitude of the virtual vehicle 74 is calculated using three-dimensional information of the road surface 70 at a position where the wheels (four wheels) of the virtual vehicle 74 contact with the road surface 70. On the other hand, although the virtual vehicle 74 illustrated in FIG. 15 to FIG. 17 is displayed at a position preceding the vehicle 1, as schematically illustrated in FIG. 15, the position of the virtual vehicle 74 is displayed such that the position of the wheels (rear wheels 74b) of the virtual vehicle 74 on the side closer to the vehicle 1 advances to the position corresponding to the wheels (front wheels 3F) on the front side in the traveling direction of the vehicle 1. That is, the virtual vehicle 74 is displayed in such a display manner that the front wheels 3F of the vehicle 1 substantially overlap the rear wheels 74b of the virtual vehicle 74. In this case, the state of the rear wheels 74b of the virtual vehicle 74 can be considered to be equal to the state of the front wheels 3F of the vehicle 1. That is, information for indicating the position of the rear wheels 74b of the virtual vehicle 74 can use information indicating the actual state of the front wheels 3F of the vehicle 1. Therefore, when the vehicle attitude of the virtual vehicle 74 is determined, it is simply necessary to acquire three-dimensional information when the right and left front wheels 74a of the virtual vehicle 74 contact with the road surface 70. As a result, compared with when the display positions of all the wheels are computed as in the virtual vehicle 74 illustrated in FIG. 7 to FIG. 9, the computation load for displaying the virtual vehicle 74 can be reduced.

FIG. 16 is an example of the screen 8a appearing on the display device 8 when the virtual vehicle 74 is present in the positional relation to the vehicle 1 as illustrated in FIG. 15. In this case, the virtual vehicle 74 is displayed in a translucent state with a high display transparency so that the roughness state of the road surface 70, the path markers RL and RR, and the like are easily recognized. Since the virtual vehicle 74 is present immediately before the vehicle 1 (vehicle image J), the virtual vehicle 74 is displayed in a manner of partial display (partial virtual vehicle) including the wheels (front wheels 74a) on the front side in the traveling direction. In the example in FIG. 16, part of the front wheels 74a and the rear wheels 74b and part of the framework of the virtual vehicle 74 are displayed. In the case of FIG. 16, on the screen 8a, the display range of the vehicle image J indicating the position of the vehicle 1 is larger than in the example in FIG. 5 such that a front wheels 76 corresponding to the front wheels 3F can be displayed. In the case of FIG. 16, although the rear wheels 74b of the virtual vehicle 74 are shifted from the front wheels 76 of the vehicle image J for the sake of explanation, the wheels may be displayed with a smaller amount of shift or in a completely overlapping state. In this way, the front wheels of the vehicle 1 (the front wheels 76 of the vehicle image J) and the rear wheels 74b of the virtual vehicle 74 are displayed so as to overlap each other, whereby the processing load of the CPU 14a can be reduced. In addition, since the virtual vehicle 74 is positioned immediately before the vehicle 1 (vehicle image J), the user can easily grasp how the attitude of the vehicle 1 is changing from now on as the vehicle 1 moves ahead.

FIG. 17 is an example in which when the road surface 70 is flat, a reference marker 78 indicating the flat state is superimposed together with the path markers RL and RR and the virtual vehicle 74 as guide markers on the screen 8a in FIG. 16. When the user makes a display request through the operation input unit 10 or the operation unit 14g, the reference marker acquiring module 54 acquires the reference marker 78 from the ROM 14b or the SSD 14f. The superimpose module 62 then superimposes the reference marker 78 on the image representing the road surface 70. In this way, the path markers RL and RR and the virtual vehicle 74 and the reference marker 78 are displayed simultaneously in a manner that they can be easily compared, whereby the state of the guide markers (the path markers RL and RR and the virtual vehicle 74), for example, the roughness state and the inclination state can be easily grasped, and the roughness state of the road surface 70 can be grasped more easily and intuitively. The reference marker 78 may be displayed when only the path markers RL and RR are displayed on the road surface 70 as illustrated in FIG. 5 and FIG. 6 or when the virtual vehicle 74 is displayed at a distance from the vehicle 1 as illustrated in FIG. 7 to FIG. 9 to achieve similar effects. In the display example in the fixed mode in FIG. 16 and FIG. 17, the highlight processing module 56 may perform highlight display according to the peripheral condition, in the same manner as in the display example in the traveling mode illustrated in FIG. 14. The marker processing module 58 may change the display manner of the virtual vehicle 74. In any case, the similar effects as in the traveling mode illustrated in FIG. 14 can be achieved.

Figure 18:
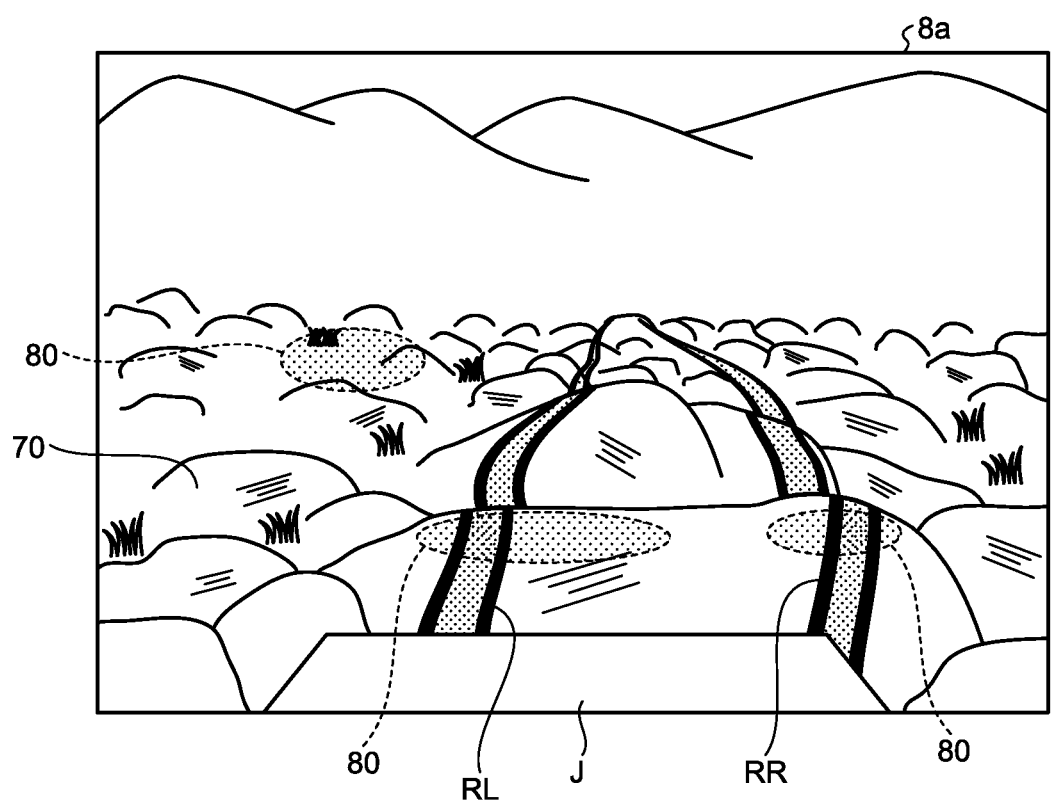
FIG. 18 is a diagram illustrating a display example for explaining another display manner in which a region exhibiting a roughness state equal to or greater than a predetermined threshold is highlighted when a path marker is displayed as a guide marker, in the periphery monitoring apparatus according to embodiments.
Figure 19:
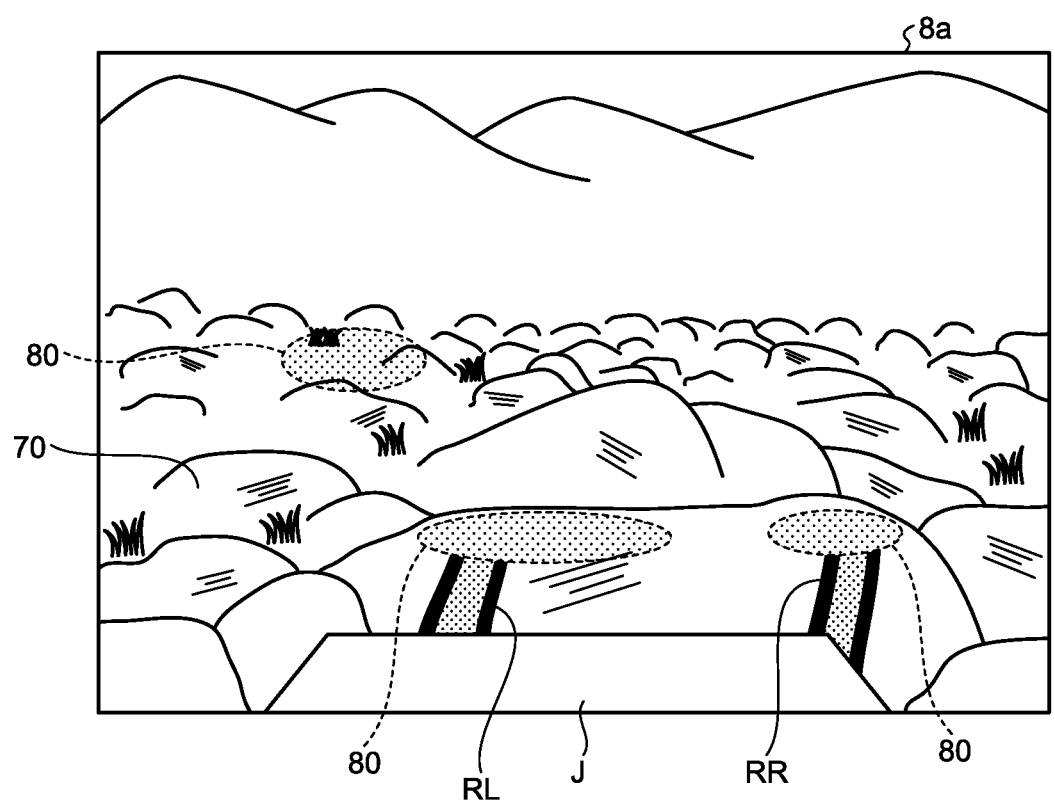
FIG. 19 is a diagram illustrating a display example for explaining a display manner in which when a path marker is displayed as a guide marker, a region exhibiting a roughness state equal or greater than a predetermined threshold is highlighted and a path marker indicating the driving beyond the region is not preferable is depicted, in the periphery monitoring apparatus according to embodiments.

FIG. 18 and FIG. 19 are diagrams illustrating a display example in another embodiment of highlight display illustrated in FIG. 6. The highlight display in FIG. 6 is a display example in which a section that requires special caution is highlighted in the path markers RL and RR. On the other hand, in the example in FIG. 18, when a region 80 that requires special caution is present in a region ahead of the vehicle 1, the entire region 80 is highlighted. When the region 80 having a height or a gradient equal to or greater than a predetermined threshold relative to the position of the vehicle 1 is extracted based on the roughness state of the road surface 70 detected by the roughness state detecting module 32, the highlight processing module 56 performs a highlighting process on the extracted region. As highlight display, for example, the region to be highlighted is displayed in a display color different from the color of the road surface 70, or the region 80 is displayed so as to blink, or the brightness of the region 80 is changed. In FIG. 18, the region 80 is, for example, a protrusion having a height that rubs the bottom surface of the vehicle 1. In this way, since the region that the vehicle 1 should not pass through is clearly defined, it is possible to improve the efficiency of operating the steering unit 4 to search for the path markers RL and RR directed in another direction easier to drive.

FIG. 19 is a modification to FIG. 18. When the highlight processing module 56 performs a highlighting process on the regions 80, the marker processing module 58 hides the section of the path markers RL and RR that extends ahead beyond the regions 80. In this way, the path markers RL and RR are hidden halfway to provide the user with a clear message that the driving beyond the highlighted region 80 should be avoided. In this case, the path markers RL and RR beyond the regions 80 may be identified by changing the display manner, rather than completely hiding. For example, the path markers RL and RR beyond the regions 80 may be displayed so as to blink in red or may be obscured by further increasing the transparency to achieve similar effects.

Figure 20:
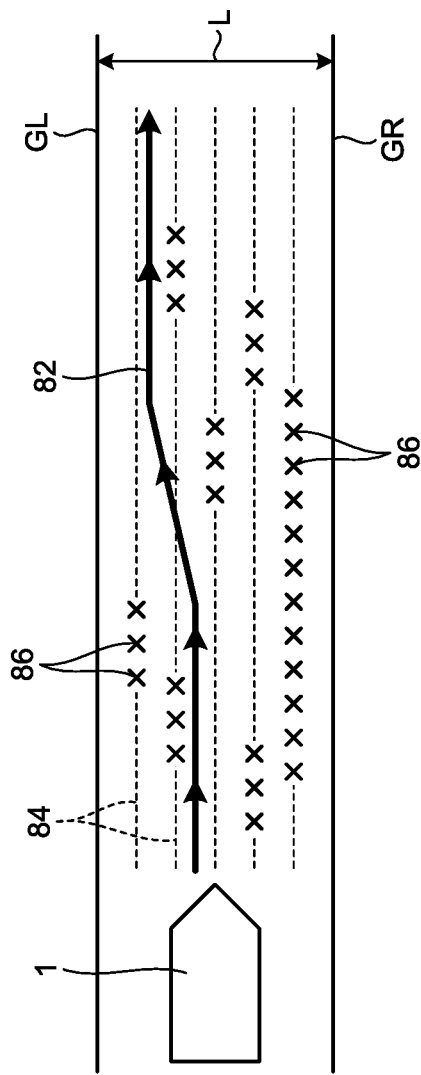
FIG. 20 is a schematic diagram illustrating a calculation example of a recommended route through which driving is recommended and a setting example of the calculation range of the recommended route, in the periphery monitoring apparatus according to embodiments.

FIG. 20 is a schematic diagram illustrating an application example in which the route calculating module 40 calculates a recommended route. In the example illustrated in FIG. 13, the recommended routes SRL and SRR are depicted corresponding to the left and right front wheels 3F, in a display manner similar to the path markers RL and RR. However, in the case of FIG. 20, the direction in which the vehicle 1 moves ahead is depicted by a single line of recommended route 82. When the route calculating module 40 calculates the recommended route 82, the route calculating module 40 calculates the recommended route 82 such that the number of times the vehicle 1 passes through a place that tilts the vehicle 1 by a predetermined angle or greater (a place where up-down movement is equal to or greater than a predetermined value) is minimized. In another example, the route calculating module 40 sets, for example, a plurality of virtual straight lines 84 parallel to the vehicle front-back direction relative to the vehicle 1 in the direction ahead of the vehicle 1. The route calculating module 40 then refers to the roughness state of the road surface 70 detected by the roughness state detecting module 32 to extract a rough position 86 where the vehicle 1 tilts by a predetermined angle or greater (the up-down movement is equal to or greater than a predetermined value) on the virtual straight line 84. The route calculating module 40 then temporarily divides the virtual straight line 84 at a position where the rough position 86 exists. Subsequently, the route calculating module 40 connects the divided virtual straight lines 84 again so that changing the steering angle is minimized. With such processing, the recommended route 82 can be easily calculated to avoid the place where the vehicle 1 tilts by a predetermined angle or greater (the place where the up/down movement is equal to or greater than a predetermined value). Driving on such a recommended route 82 can reduce the shaking of the vehicle 1 and advantageously can alleviate carsick or alleviate damage to the vehicle 1.

When the recommended route 82 is calculated as described above, depending on the roughness state of the road surface 70, for example, rough positions 86 through which passage should be avoided may be concentrated on the right side ahead of the vehicle 1, and the route calculating module 40 may only select, for example, paths directed in the left direction. In this case, the recommended route 82 directed in a direction significantly deviating from the direction intended by the user may be calculated. When calculating the recommended route 82, the route calculating module 40 therefore may set a searchable range for the recommended route 82 relative to the position of the vehicle 1. For example, as illustrated in FIG. 20, limit lines GL and GR are set at positions 15 meters to the left and right in the vehicle width direction relative to the vehicle 1. That is, the recommended route 82 is set in a range of a search width L (for example, 30 meters). In this case, compared with when no limit lines GL, GR are set, the number of times of the vehicle 1 passes through a region that tilts the vehicle 1 by a predetermine angle or greater (a region in which the up-down movement is equal to or greater than a predetermined value) may be increased. However, it is more likely that the recommended route 82 mostly directed in the direction desired by the user is presented, and the more practicable recommended route 82 can be presented. After the recommended route 82 is determined, the ECU 14 may allow the vehicle 1 to run autonomously in accordance with the recommended route 82.

In the example illustrated in FIG. 20, the limit lines GL and GR are set so as to extend in the same direction as the front-back direction of the vehicle 1 and have the same distance from the vehicle 1 in the vehicle width direction. The limit lines GL and GR may be set to a fixed value in this manner, or the setting may be changed as appropriate through the operation input unit 10 or the operation unit 14g. For example, the distance may not be equal between the left and the right, such as 10 meters in the left direction of the vehicle 1 and 20 meters in the right direction. The setting direction of the limit lines GL and GR may be changed. For example, the limit lines GL and GR may be oriented in a direction inclined by 30° to the right relative to the front of the vehicle 1. Alternatively, the limit line GL may be oriented in the front direction relative to the vehicle 1, and the limit line GR may be set in a direction inclined by 30° to the right relative to the front of the vehicle 1. Alternatively, only one of the limit line GL and the limit line GR may be set.

Figure 21:
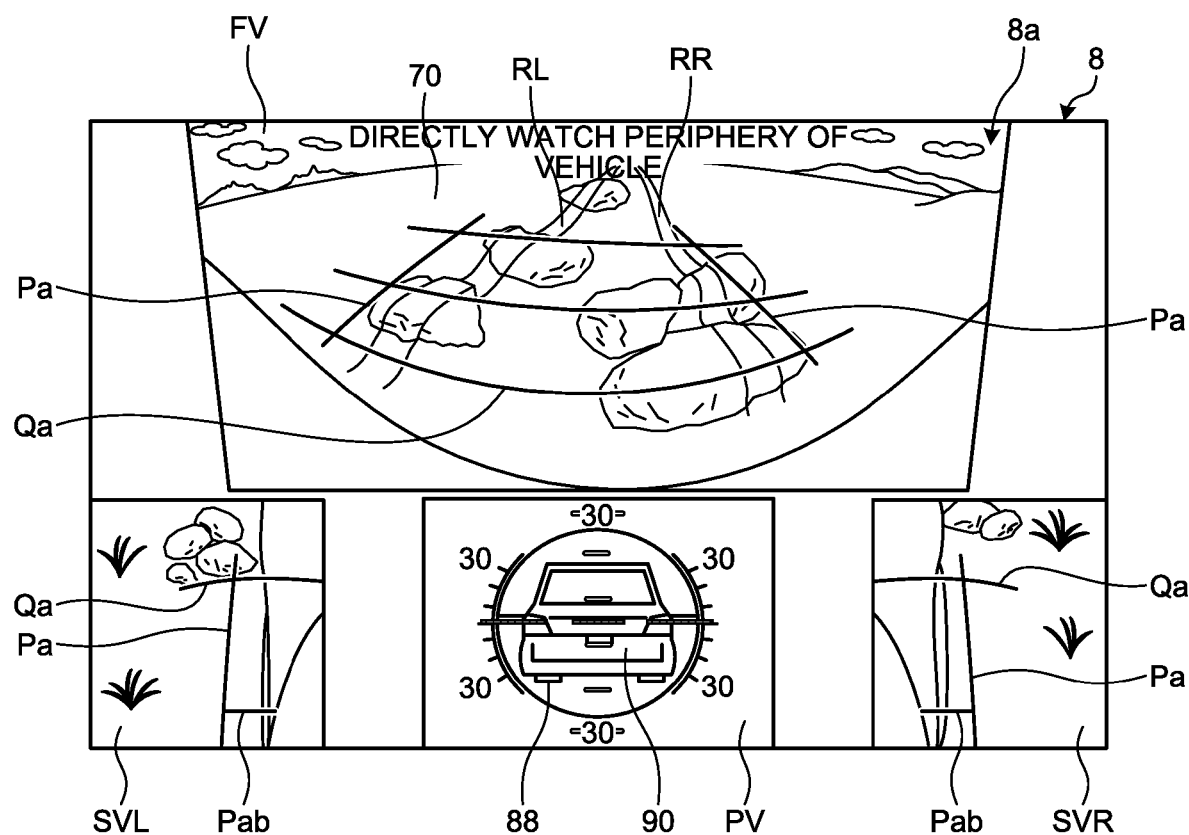
FIG. 21 is an illustration of another layout example of a display region in the display device when guide markers are displayed, in the periphery monitoring apparatus according to embodiments.

FIG. 21 illustrates a display example including other additional information in the display device 8. In the display examples described above, the screen 8a presents information of a region ahead of the vehicle 1 (only one region). On the other hand, in a modification illustrated in FIG. 21, the display device 8 displays images in a variety of directions, an inclinometer 88 indicating the attitude of the vehicle 1, and the like in a plurality of divided display regions. For example, a front display region FV is disposed at the upper center of the display region of the display device 8, a left-side display region SVL is disposed below and to the left, and a right-side display region SVR is disposed below and to the right of the front display region FV. An attitude display region PV displaying the inclinometer 88 is disposed below the front display region FV. In the front display region FV, the screen 8a illustrated in FIG. 5 to FIG. 10, FIG. 13, FIG. 16 to FIG. 19, etc. may be displayed. In the front display region FV, in addition to the path markers RL and RR, a front reference line Qa indicating the approximate distance from the end portion 2c on the front side of the body 2 and a side reference line Pa indicating the approximate distance from the end portion 2d, 2f on the side of the body 2 can be superimposed. The front reference line Qa and the side reference line Pa may be superimposed also on the left-side display region SVL and the right-side display region SVR. In the left-side display region SVL, a left-side image (for example, an image of the left side viewed from above) of the vehicle 1 based on the captured image data acquired by the imager 15d is displayed. In the right-side display region SVR, a right-side image (for example, an image of the right side viewed from above) of the vehicle 1 based on the captured image data acquired by the imager 15b is displayed. The left-side image and the right-side image may include the road surface 70 on the side of the vehicle 1 and part of the corresponding wheels 3.

Such display makes it easier to understand the state of the road surface 70 around the vehicle 1. The display is provided such that the relation of the front display region FV with the left-side display region SVL and the right-side display region SVR is easily understood. The side reference lines Pa in the left-side display region SVL and the right-side display region SVR are provided with ground contact lines Pab indicating the ground contact positions of front wheels 3F so that the position of the front wheels 3F can be easily understood. In FIG. 21, the side reference line Pa and the front reference line Qa are displayed as fixed lines straight or in a curved shape corresponding to the curve characteristics of the lens. However, the side reference line Pa and the front reference line Qa may also be displayed in a display manner that follows a roughness state of the road surface 70 in the same manner as the path markers RL and RR. In this case, the roughness shape of the road surface 70 can be easily grasped also from the shapes of the side reference line Pa and the front reference line Qa.

The inclinometer 88 displays the inclination of the vehicle 1 in the right-left direction (roll angle) and the inclination in the front-back direction (pitch angle) with the attitude of a symbol 90, based on a signal from the acceleration sensor 26 (26a, 26b). The attitude of the symbol 90 and the guide markers in a display manner that follows a roughness state of the road surface 70 are displayed in the same screen, whereby the situation of the road surface 70 around the vehicle 1 can be grasped more easily. An overhead image as illustrated in FIG. 14 may be displayed in the front display region FV to achieve similar effects as in the foregoing examples.

The layout of the display region on the display device 8 in FIG. 21 is illustrated by way of example, and a variety of layouts can be employed. For example, the size in the up-down direction of the left-side display region SVL and the right-side display region SVR may be increased to extend to the sides of the front display region FV. In this way, the left-side display region SVL and the right-side display region SVR are disposed so as to surround the front display region FV, so that they can be displayed on the display device 8 such that the situation around the vehicle 1 with the driver's seat at the center can be grasped more easily.

In the foregoing embodiments, the display of the path markers RL and RR, etc. is updated according to the steering angle detected by the steering angle sensor 19, so that the roughness state of the road surface 70 can be displayed in a wide range such that the user can easily grasp the roughness condition in the desired direction. Here, if the detection result of the steering angle sensor 19 is an error, default path markers RL and RR may be displayed. For example, the path markers RL and RR oriented right in front of the vehicle 1 may be displayed so as to be fixed. In this case, it is advantageous in that the roughness shape of the road surface 70 at least in front of the vehicle 1 can be easily grasped.

When the imager 15c is a stereo camera, three-dimensional information fails to be acquired in case of an error in one of two cameras. In this case, the peripheral information acquiring module 30 may use the imager 15c solely for acquiring a peripheral image to provide at least a peripheral image of the vehicle 1.

In the example in the foregoing embodiment, when a display request for the virtual vehicle 74 is received, the virtual vehicle 74 is displayed in a display manner that follows the roughness state of the road surface 70. However, the display manner of the virtual vehicle 74 may be changed according to the roughness state of the road surface 70. For example, when the roughness state of the road surface 70 in the traveling direction of the vehicle 1 (the height or gradient relative to the position where the vehicle 1 is present) is equal to or greater than a predetermined threshold, the marker processing module 58 superimposes a guide marker in a display manner that follows the roughness state of the road surface 70 on the screen 8a and displays the image on the display device 8. That is, when the roughness state of the road surface 70 is smaller than a predetermined threshold, the virtual vehicle 74 may be displayed, for example, in an attitude in a default state (the attitude on a flat road). Such display can simplify the process for displaying the virtual vehicle 74 and reduce the processing load.

In the example illustrated in the foregoing embodiments, when the virtual vehicle 74 is displayed in the traveling mode, the virtual vehicle 74 is displayed so as to continuously move. In another embodiment, the virtual vehicle 74 may be stopped at a predetermined position (any position on the predicted path) upon the user's instruction (instruction through the operation input unit 10 or the operation unit 14g) during execution of the traveling mode (during movement of the virtual vehicle along the predicted path). Alternatively, the virtual vehicle 74 may be stopped at a preset position during execution of the traveling mode. In this way, the action in the traveling mode is combined with the action in the fixed mode to make it easier to examine the transition of the vehicle attitude changing with movement of the virtual vehicle 74. In addition, stopping the virtual vehicle 74 makes it possible to fully (closely) examine the state of the virtual vehicle 74 at the stop position. Here, the user operates the steering unit 4 to change the moving route of the virtual vehicle 74, thereby changing the attitude when the virtual vehicle 74 stops. For example, the user may wish to move the vehicle 1 to a desired position in a desired attitude (for example, when parking). In this case, the virtual vehicle 74 is stopped at the desired position during execution of the traveling mode, or the moving distance may be set before execution of the traveling mode so as to stop at a desired position relative to the present position of the vehicle 1. Stopping the virtual vehicle 74 at a desired position makes it easier to grasp the attitude of the virtual vehicle 74 during stop. The user can minutely adjust the steering unit 4 to select the orientation of the front wheels 3F such that the virtual vehicle 74 attains a desired attitude, whereby the user can move (for example, park) the vehicle 1 to a desired position in a desired attitude.

In the foregoing embodiments, the vehicle 1 mainly moves forward. However, the embodiments are applicable to the case where the vehicle 1 moves backward to achieve similar effects. For example, even when the vehicle 1 is backed into a parking space, the roughness state of the road surface is easily grasped, and the virtual vehicle 74 moving in a desired attitude (for example, the attitude parallel to the parking space) into a parking space is displayed to facilitate appropriate operation of the steering unit 4.

Although embodiments and modifications of the present invention have been described above, these embodiments and modifications are presented only by way of example and are not intended to limit the scope of the invention. These new embodiments can be carried out in various other manners and are susceptible to emission, replacement, and modifications without departing from the scope of the invention. The embodiments and modifications thereof are embraced in the scope and spirit of the invention and embraced in the equivalents to the invention recited in the claims.

REFERENCE SIGNS LIST 1 vehicle
3 wheel
3F front wheel
4 steering unit
8 display device
8a screen
10 operation input unit
11 monitor device
14 ECU
14a CPU
14b ROM
14c RAM
15 imager
19 steering angle sensor
26 acceleration sensor
30 peripheral information acquiring module
32 roughness state detecting module (detector)
34 steering angle acquiring module
36 marker acquiring module (acquisition unit)
38 marker control module (controller)
40 route calculating module
42 output module
50 path marker acquiring module
52 virtual vehicle acquiring module
54 reference marker acquiring module
56 highlight processing module
58 marker processing module
60 peripheral image processing module
62 superimpose module
64 guide processing module
70 road surface
74 virtual vehicle
78 reference marker
100 periphery monitoring system
RL, RR path marker

The invention claimed is:

1. A periphery monitoring apparatus comprising:
a detector configured to detect a roughness state of a road surface in a traveling direction of a vehicle;
a processor configured to implement an acquisition unit configured to acquire a guide marker to be superimposed onto an image based on captured image data output from an imager that captures an image of a peripheral region including the traveling direction of the vehicle, the guide marker being displayed in a manner that follows a roughness state of the road surface in the traveling direction of the vehicle; and
a controller configured to superimpose the guide marker onto the image in the display manner that follows the roughness state and display the image on a display device
wherein the acquisition unit acquires, as the guide marker, a virtual vehicle having a vehicle attitude changing with a roughness state of the road surface, the virtual vehicle being superimposed onto a region in the traveling direction of the vehicle.

2. The periphery monitoring apparatus according to claim 1, wherein the acquisition unit acquires, as the guide marker, a path marker indicating an expected traveling direction of a wheel based on a steering angle of the vehicle.

3. The periphery monitoring apparatus according to claim 1, wherein the controller performs a roughness highlighting process on a region in the image on which the guide marker is superimposed.

4. The periphery monitoring apparatus according to claim 1, wherein the controller performs a highlighting process on a region indicating the roughness state of the road surface equal to or greater than a predetermined threshold.

5. The periphery monitoring apparatus according to claim 1, wherein the acquisition unit acquires, as the virtual vehicle, a partial virtual vehicle including a wheel on a side far from a wheel of the vehicle on a front side in the traveling direction, the partial virtual vehicle being acquired when a position of a wheel of the virtual vehicle on a side closer to the vehicle moves to a position corresponding to the wheel of the vehicle on the front side in the traveling direction.

6. The periphery monitoring apparatus according to claim 1, wherein the controller displays, on the display device, a peripheral image viewed from a position of the virtual vehicle when the virtual vehicle exists at a position a predetermined distance ahead in the traveling direction of the vehicle.

7. A periphery monitoring apparatus comprising:
a processor configured to implement an acquisition unit configured to acquire a guide marker to be superimposed onto an image based on captured image data output from an imager that captures an image of a peripheral region including the traveling direction of the vehicle, the guide marker being in a traveling direction of a vehicle; and
a controller configured to superimpose the guide marker onto the image and display the image on a display device,
wherein the controller superimposes, as the guide marker, a virtual vehicle corresponding to the vehicle and displays the image on the display device,
wherein the acquisition unit acquires, as the virtual vehicle, a partial virtual vehicle including a wheel on a side far from a wheel of the vehicle on a front side in the traveling direction, the partial virtual vehicle being acquired when a position of a wheel of the virtual vehicle on a side closer to the vehicle moves to a position corresponding to the wheel of the vehicle on the front side in the traveling direction.

8. The periphery monitoring apparatus according to claim 7, wherein the acquisition unit acquires, as the guide marker, in addition to the virtual vehicle, a path marker indicating an expected traveling direction of a wheel based on a steering angle of the vehicle.

9. The periphery monitoring apparatus according to claim 7, further comprising a detector configured to detect a roughness state of a road surface in the traveling direction of the vehicle,
wherein the controller displays, on the display device, the virtual vehicle in an attitude corresponding to the roughness state of the road surface.

10. A periphery monitoring apparatus comprising:
a processor configured to implement an acquisition unit configured to acquire a guide marker to be superimposed onto an image based on captured image data output from an imager that captures an image of a peripheral region including the traveling direction of the vehicle, the guide marker being in a traveling direction of a vehicle; and
a controller configured to superimpose the guide marker onto the image and display the image on a display device,
wherein the controller superimposes, as the guide marker, a virtual vehicle corresponding to the vehicle and displays the image on the display device,
wherein the controller displays, on the display device, a peripheral image viewed from a position of the virtual vehicle when the virtual vehicle exists at a position a predetermined distance ahead in the traveling direction of the vehicle.

11. A periphery monitoring apparatus comprising:
a processor configured to implement an acquisition unit configured to acquire a guide marker to be superimposed onto an image based on captured image data output from an imager that captures an image of a peripheral region including the traveling direction of the vehicle, the guide marker being in a traveling direction of a vehicle; and
a controller configured to superimpose the guide marker onto the image and display the image on a display device,
the controller superimposes, as the guide marker, a virtual vehicle corresponding to the vehicle and displays the image on the display device,
wherein the controller displays, on the display device, a course of the virtual vehicle moving over a predetermined distance along a predicted path on which the vehicle is expected to move, and
the controller displays a vehicle image indicating a present position of the vehicle on the display device and displays the virtual vehicle on the display device in a display manner that the virtual vehicle travels to separate from the vehicle image.

12. A periphery monitoring apparatus comprising:
a processor configured to implement an acquisition unit configured to acquire a guide marker to be superimposed onto an image based on captured image data output from an imager that captures an image of a peripheral region including the traveling direction of the vehicle, the guide marker being in a traveling direction of a vehicle; and
a controller configured to superimpose the guide marker onto the image and display the image on a display device,
wherein the controller superimposes, as the guide marker, a virtual vehicle corresponding to the vehicle and displays the image on the display device,
the controller displays the virtual vehicle on the display device in a display manner that the virtual vehicle travels in a direction in which the vehicle is expected to move, and
the controller stops movement of the virtual vehicle at a position where a predetermined stop condition is satisfied.

13. The periphery monitoring apparatus according to claim 12, wherein the controller determines that the predetermined stop condition is satisfied when a stop operation input signal is received.

14. The periphery monitoring apparatus according to claim 12, wherein the controller determines whether the predetermined stop condition is satisfied based on information on an object that presents in a traveling direction of the virtual vehicle and contacts with the vehicle.

15. The periphery monitoring apparatus according to claim 1, wherein when displaying the guide marker in a display manner that follows a roughness state of a road surface, the controller displays, together with the guide marker, a reference marker indicating a flat state where the road surface is flat.

16. The periphery monitoring apparatus according to claim 7, wherein when displaying the guide marker in a display manner that follows a roughness state of a road surface, the controller displays, together with the guide marker, a reference marker indicating a flat state where the road surface is flat.

* * * * *